United States Patent
Li et al.

(10) Patent No.: US 10,574,799 B2
(45) Date of Patent: Feb. 25, 2020

(54) MOBILE TERMINAL WITH CAMERA ARRANGED ON MOVABLE SHELL

(71) Applicant: GUANGDONG OPPO MOBILE TELECOMMUNICATIONS CORP., LTD., Dongguan, Guangdong (CN)

(72) Inventors: Mingyang Li, Dongguan (CN); Zhen Li, Dongguan (CN)

(73) Assignee: GUANGDONG OPPO MOBILE TELECOMMUNICATIONS CORP., LTD, Dongguan, Guangdong (CN)

( * ) Notice: Subject to any disclaimer, the term of this patent is extended or adjusted under 35 U.S.C. 154(b) by 0 days.

(21) Appl. No.: 16/213,300

(22) Filed: Dec. 7, 2018

(65) Prior Publication Data

US 2019/0253538 A1    Aug. 15, 2019

(30) Foreign Application Priority Data

Feb. 9, 2018 (CN) .................... 2018 2 0236848 U

(51) Int. Cl.
*H04M 1/02* (2006.01)
*H04N 5/225* (2006.01)
(Continued)

(52) U.S. Cl.
CPC ............ *H04M 1/0237* (2013.01); *H01F 7/20* (2013.01); *H04M 1/0264* (2013.01);
(Continued)

(58) Field of Classification Search
CPC ..... H04M 1/0237; H04M 1/0264; H01F 7/20; H04N 2007/145; H04N 5/2252; H04N 7/142; H04N 5/2257
See application file for complete search history.

(56) References Cited

U.S. PATENT DOCUMENTS 8,112,128 B2 *  2/2012  Lee ..................... H04M 1/0264
                                                        16/224
9,647,474 B2    5/2017  Fathollahi et al.
(Continued)

FOREIGN PATENT DOCUMENTS

CN        101166199 A      4/2008
CN        101741932 A      6/2010
(Continued)

OTHER PUBLICATIONS

International Search Report in international application No. PCT/CN2018/119171, dated Feb. 27, 2019.
(Continued)

*Primary Examiner* — Brandon J Miller
(74) *Attorney, Agent, or Firm* — Ladas & Parry, LLP

(57) ABSTRACT

A mobile terminal includes a rear housing, a display screen and a camera. The rear housing includes a first shell and a second shell. The second shell can be slid relative to the display screen and can be stopped at a first position and a second position. The camera is arranged on the second shell, and an orientation of a light incident surface of the camera is the same as that of the display screen. In the first position, the first shell contacts the second shell to jointly bear the display screen and enable the rear housing to be of an opened-box shape, and the camera is located inside the mobile terminal. In the second position, the camera can be exposed from the mobile terminal.

19 Claims, 22 Drawing Sheets

(51) Int. Cl.
*H04N 7/14* (2006.01)
*H01F 7/20* (2006.01)

(52) U.S. Cl.
CPC ......... *H04N 5/2252* (2013.01); *H04N 5/2257* (2013.01); *H04N 7/142* (2013.01); *H04N 2007/145* (2013.01)

(56) References Cited

U.S. PATENT DOCUMENTS

| | | |
|---|---|---|
| 9,929,577 B2 | 3/2018 | Fathollahi et al. |
| 2007/0249389 A1* | 10/2007 | Hotta ................. H04M 1/0208 455/552.1 |
| 2008/0067045 A1 | 3/2008 | Jang |
| 2009/0203398 A1 | 8/2009 | Griffin |
| 2009/0212675 A1 | 8/2009 | Zhang |
| 2010/0120480 A1 | 5/2010 | Jung |
| 2011/0273374 A1 | 11/2011 | Wood |
| 2013/0206614 A1 | 8/2013 | O'Neill et al. |
| 2015/0194833 A1 | 7/2015 | Fathollahi et al. |
| 2015/0264162 A1* | 9/2015 | Peng ................. H04M 1/0264 455/556.1 |
| 2016/0216477 A1* | 7/2016 | Barros ................. H04N 5/2252 |
| 2017/0214263 A1 | 7/2017 | Fathollahi et al. |
| 2017/0223158 A1* | 8/2017 | Yin ........................ H04M 1/02 |
| 2018/0262663 A1 | 9/2018 | Zhang |
| 2018/0375353 A1 | 12/2018 | Fathollahi et al. |
| 2019/0033926 A1* | 1/2019 | Huang .................. G06F 1/1686 |

FOREIGN PATENT DOCUMENTS

| | | |
|---|---|---|
| CN | 105006081 A | 10/2015 |
| CN | 105100312 A | 11/2015 |
| CN | 206077509 U | 4/2017 |
| CN | 106850896 A | 6/2017 |
| CN | 208015781 U | 12/2018 |
| DE | 202017003703 U1 | 7/2017 |
| EP | 2387212 A1 | 11/2011 |
| EP | 2613448 A1 | 7/2013 |
| EP | 3163845 A1 | 5/2017 |
| EP | 3373562 A1 | 9/2018 |

OTHER PUBLICATIONS

Written Opinion of the International Search Authority in international application No. PCT/CN2018/119171, dated Feb. 27, 2019.
Supplementary European Search Report in the European application No. 18209182.7, dated May 15, 2019.

* cited by examiner

MOBILE TERMINAL WITH CAMERA ARRANGED ON MOVABLE SHELL

CROSS-REFERENCE TO RELATED APPLICATION

The present application claims benefit of Chinese Patent Application No. 201820236848.8, filed on Feb. 9, 2018, the contents of which are hereby incorporated by reference in its entirety.

TECHNICAL FIELD

The disclosure relates to the field of mobile terminals, and in particular to a mobile terminal.

BACKGROUND

At present, a mobile terminal such as a smart mobile phone is equipped with a front camera for providing functions such as a video call and a selfie. The front camera needs to occupy a partial space of a panel of the mobile terminal, which results in that an area for displaying on the panel of the mobile terminal is reduced relatively and thus is not beneficial to implementing the high screen-to-body ratio pursued at present.

SUMMARY

An embodiment of the disclosure provides a mobile terminal, which may implement the high screen-to-body ratio.

The mobile terminal may include a rear housing, a display screen and a camera. The rear housing includes a first shell, a bearing portion and a second shell. The bearing portion extends from the first shell. The bearing portion and the first shell cooperatively define a receiving space. The second shell is slidably arranged on the bearing portion and is movable relative to the first shell to be in a first position and a second position. The second shell fills and levels up the receiving space and surrounds the bearing portion in the first position, and in the second position, at least a part of the bearing portion is exposed due to the movement of the second shell. The display screen is connected with the first shell. The camera is arranged on the second shell. In the first position, a light incident surface of the camera is blocked, and in the second position, the light incident surface of the camera is exposed.

Another embodiment of the disclosure also provides a mobile terminal which may include a rear housing, a display screen and a camera. The rear housing includes a first shell, a bearing portion and a second shell. The bearing portion extends from the second shell. The bearing portion and the second shell cooperatively define a receiving space. The second shell is slidably arranged with respect to the first shell via the bearing portion and is movable relative to the first shell to be in first position and a second position. The second shell fills and levels up the receiving space and surrounds the bearing portion in the first position. In the second position, at least a part of the bearing portion is exposed due to the movement of the second shell. The display screen is connected with the first shell. The camera is arranged on the second shell. In the first position, a light incident surface of the camera is blocked, and in the second position, the light incident surface of the camera is exposed.

Yet another embodiment of the disclosure also provides a mobile terminal which includes a rear housing, a display screen and a camera, and the rear housing includes a first shell and a second shell. The first shell is fixedly connected with the display screen. The second shell can be slid relative to the display screen and is stopped at a first position and a second position. When the second shell is stopped at the first position, the first shell contacts the second shell to jointly bear the display screen and enable the rear housing to be of an opened-box shape. The first shell includes a bottom wall as well as a first side perimeter wall, a second side perimeter wall and a third side perimeter wall extending from three edges of the bottom wall. The first side perimeter wall and the second side perimeter wall are arranged opposite to one another and the third side perimeter wall is connected between the first side perimeter wall and the second side perimeter wall. The second shell includes a bottom plate as well as a first side wall, a second side wall and an end wall extending from three edges of the bottom plate. The first side wall and the second side wall are arranged opposite to one another, and the end wall is connected between the first side wall and the second side wall. An outer surface of the bottom wall is flush with an outer surface of the bottom plate. An outer surface of the first side perimeter wall is flush with an outer surface of the first side wall. An outer surface of the second side perimeter wall is flush with an outer surface of the second side wall. The camera is arranged on the second shell. When the second shell is slid to the first position, the camera is located inside the mobile terminal. When the second shell is slid to the second position, the camera can be exposed from the mobile terminal, and an orientation of a light incident surface of the camera is the same as that of the display screen.

According to the mobile terminal, the camera is arranged on the movable second shell and a space for setting the display screen is not occupied, so the relatively high screen-to-body ratio may be obtained.

DETAILED DESCRIPTION

Figure 1:
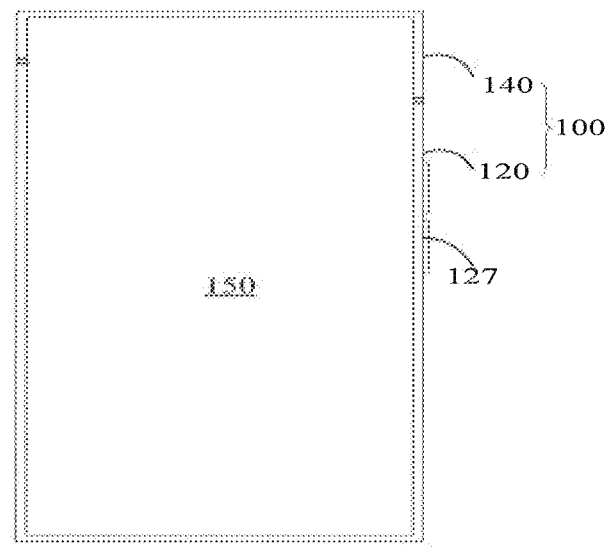
FIG. 1 illustrates a front view of a mobile terminal provided by a first embodiment of the disclosure.

The communication terminal (or abbreviated as a "Terminal") includes, but not limited to, a device configured to connect via a wired circuit (for example, via a Public Switched Telephone Network (PSTN), a Digital Subscriber Line (DSL), a digital cable, a direct cable connection and/or another data connection/network) and/or receive/send a communication signal via a wireless interface of (for example, a cellular network, a Wireless Local Area Network (WLAN), a digital television network such as a (Digital Video Broadcasting-Handheld (DVB-H) network, a satellite network, an AM-FM broad transmission equipment and/or another communication terminal). The communication terminal configured to communicate via a wireless interface may be referred to as a "wireless communication terminal", a "wireless terminal" and/or a "mobile terminal". Examples of the mobile terminal provided by the disclosure include, but not limited to, a satellite or cellular telephone, a Personal Communication System (PCS) terminal capable of combining with a cellular wireless telephone and data processing, faxing and data communication abilities, a Personal Digital Assistant (PDA) that may include a radio telephone, a pager, an internet/intranet access, a Web browser, a memo pad, a calendar and/or a Global Position System (GPS) receiver, and a conventional laptop and/or palmtop receiver or other electronic devices including a radio telephone receiver.

An embodiment of the disclosure provides a mobile terminal, which may include a rear housing, a display screen and a camera. The rear housing includes a first shell, a bearing portion and a second shell. The bearing portion extends from the first shell. The bearing portion and the first shell cooperatively define a receiving space. The second shell is slidably arranged on the bearing portion and is movable relative to the first shell to be in a first position and a second position. The second shell fills and levels up the receiving space and surrounds the bearing portion in the first position, and in the second position, at least a part of the bearing portion is exposed due to the movement of the second shell. The display screen is connected with the first shell. The camera is arranged on the second shell. In the first position, a light incident surface of the camera is blocked, and in the second position, the light incident surface of the camera is exposed.

In one embodiment, the first shell includes a bottom wall as well as a first side perimeter wall and a second side perimeter wall extending from two opposite edges of the bottom wall. An end face is formed at the receiving space, and an intersecting line of the end face with an outer surface of the bottom wall is a straight line or a curved line.

In one embodiment, the end face is a flat surface or a curved surface.

In one embodiment, the intersecting line of the end face with the outer surface of the bottom wall is perpendicular to the first side perimeter wall or is at an acute angle to the first side perimeter wall.

In one embodiment, the bearing portion includes a substrate. The substrate is connected with the bottom wall. The thickness of the substrate is smaller than that of the bottom wall.

In one embodiment, the bearing portion includes a first side plate and a second side plate that are arranged opposite to one another. The substrate is connected between the first side plate and the second side plate. The first side plate is connected to the first side perimeter wall and the thickness of the first side plate is smaller than that of the first side perimeter wall. The second side plate is connected to the second side perimeter wall and the thickness of the second side plate is smaller than that of the second side perimeter wall.

In one embodiment, the second shell includes a bottom plate as well as a first side wall, a second side wall and an end wall that are connected with the bottom wall. The first side wall and the second side wall are arranged at two opposite edges of the bottom plate. The end wall is connected between the first side wall and the second side wall and is located at one end of the bottom plate. The camera is arranged on the end wall. An outer surface of the second side wall is flush with an outer surface of the first side perimeter wall. An outer surface of the second side wall is flush with an outer surface of the second side perimeter wall. In the first position, another end of the bottom plate, opposite to the end at where the end wall is located, is abutted against the end face. In the second position, said another end of the bottom plate is separated from the end face.

In one embodiment, tail end edges of the first side perimeter wall and the second side perimeter wall are connected with the display screen. Tail end edges of the first side wall and the second side wall of the second shell are flush with tail end edges of the first side perimeter wall and the second side perimeter wall and jointly bear the display screen in the first position.

In one embodiment, the first shell further includes a third side perimeter wall. The third side perimeter wall is connected between the first side perimeter wall and the second side perimeter wall. Tail end edges of the first side perimeter wall, the second side perimeter wall and the third side perimeter wall are connected with the display screen. The third side perimeter wall is provided with a connection port.

In one embodiment, the first shell further includes a fourth side perimeter wall. The fourth side perimeter wall is connected between the first side perimeter wall and the second side perimeter wall. Tail end edges of the first side perimeter wall, the second side perimeter wall and the fourth side perimeter wall are connected with the display screen. In the first position, an outer surface of the end wall of the second shell is flush with an outer surface of the fourth side perimeter wall. In the second position, the end wall of the second shell is unaligned with the fourth side perimeter wall.

In one embodiment, the end wall of the second shell is provided with a protrusion. The camera is arranged on the protrusion. A gap corresponding to the protrusion is formed on the fourth side perimeter wall of the first shell. In the first position, the protrusion is received in the gap.

In one embodiment, the second shell includes a bottom plate as well as a side wall and an end wall connected with the bottom plate. The camera is arranged on the side wall. The side wall and the second side perimeter wall are arranged opposite to one another. In the first position, an outer surface of the side wall is flush with the outer surface of the first side perimeter wall. In the second position, the side wall is unaligned with the first side perimeter wall and exposes the light incident surface of the camera.

In one embodiment, tail end edges of the first side perimeter wall and the second side perimeter wall are connected with the display screen. Tail end edges of the side wall and the end wall of the second shell are flush with tail end edges of the first side perimeter wall and the second side perimeter wall and jointly bear the display screen in the first position.

In one embodiment, the first shell further includes a fourth side perimeter wall. The fourth side perimeter wall is connected between the first side perimeter wall and the second side perimeter wall. Tail end edges of the first side perimeter wall, the second side perimeter wall and the fourth side perimeter wall are connected with the display screen. An outer surface of the end wall of the second shell is flush with an outer surface of the fourth side perimeter wall.

In one embodiment, the mobile terminal further includes another camera arranged on the outer surface of the bottom plate.

In one embodiment, the mobile terminal further includes another camera arranged on the bearing portion. A through hole is formed on the bottom plate of the second shell. Said another camera is exposed from the through hole.

In one embodiment, an extension length of the through hole is greater than or equal to a displacement distance of the second shell from the first position to the second position.

In one embodiment, the mobile terminal further includes another camera arranged on the bearing portion. A through hole is formed on the bottom plate of the second shell. Said another camera is exposed from the through hole. The through hole penetrates through the other end of the bottom plate.

In one embodiment, the mobile terminal further includes a functional button. The functional button is arranged on at least one of the first side wall or the second side wall of the second shell.

In one embodiment, the mobile terminal further includes at least one element selected from: infrared lenses, floodlight induction elements, distance sensors, environmental light sensors, loudspeakers, microphones and dot projectors. The at least one element is arranged on the second shell.

In one embodiment, a slide rail and a chute cooperated with each other are arranged between the bearing portion and the second shell.

In one embodiment, the second shell is provided with a clamping groove. An elastic piece and an ejector pin are arranged on the bearing portion. The elastic piece is elastically rested between the bearing portion and the ejector pin. When the second shell is transformed between the first position and the second position, the ejector pin can be slid into or out of the clamping groove.

Another embodiment of the disclosure also provides a mobile terminal which may include a rear housing, a display screen and a camera. The rear housing includes a first shell, a bearing portion and a second shell. The bearing portion extends from the second shell. The bearing portion and the second shell cooperatively define a receiving space. The second shell is slidably arranged with respect to the first shell via the bearing portion and is movable relative to the first shell to be in a first position and a second position. The second shell fills and levels up the receiving space and surrounds the bearing portion in the first position. In the second position, at least a part of the bearing portion is exposed due to the movement of the second shell. The display screen is connected with the first shell. The camera is arranged on the second shell. In the first position, a light incident surface of the camera is blocked, and in the second position, the light incident surface of the camera is exposed.

Yet another embodiment of the disclosure also provides a mobile terminal which includes a rear housing, a display screen and a camera, and the rear housing includes a first shell and a second shell. The first shell is fixedly connected with the display screen. The second shell can be slid relative to the display screen and is stopped at a first position and a second position. When the second shell is stopped at the first position, the first shell contacts the second shell to jointly bear the display screen and enable the rear housing to be of an opened-box shape. The first shell includes a bottom wall as well as a first side perimeter wall, a second side perimeter wall and a third side perimeter wall extending from three edges of the bottom wall. The first side perimeter wall and the second side perimeter wall are arranged opposite to one another and the third side perimeter wall is connected between the first side perimeter wall and the second side perimeter wall. The second shell includes a bottom plate as well as a first side wall, a second side wall and an end wall extending from three edges of the bottom plate. The first side wall and the second side wall are arranged opposite to one another, and the end wall is connected between the first side wall and the second side wall. An outer surface of the bottom wall is flush with an outer surface of the bottom plate. An outer surface of the first side perimeter wall is flush with an outer surface of the first side wall. An outer surface of the second side perimeter wall is flush with an outer surface of the second side wall.

The camera is arranged on the second shell. When the second shell is slid to the first position, the camera is located inside the mobile terminal. When the second shell is slid to the second position, the camera can be exposed from the mobile terminal, and an orientation of a light incident surface of the camera is the same as that of the display screen.

In one embodiment, the mobile terminal further includes a motor. An output shaft of the motor is provided with a gear. The second shell is provided with a rack. The rack and the gear are cooperated in such a way that the operation of the motor drives the second shell to slide relative to the first shell.

In one embodiment, the second shell is provided with a magnetic piece, and the first shell is provided with an electromagnet. An attractive force or a repulsive force for the magnetic piece on the second shell is generated by changing a polarity of the electromagnet, so as to enable the second shell to be transformed between the first position and the second position.

In one embodiment, the mobile terminal further includes a slide block, a pull rod and an elastic piece. The slide block is arranged on the second shell and is in sliding fit with the first shell. The slide block is provided with a quasi-heart-shaped groove. The quasi-heart-shaped groove has a locked position and a released position. One end of the pull rod is pivotally connected to the first shell, and another end of the pull rod is movably arranged in the quasi-heart-shaped groove. The elastic piece is compressively arranged between the first shell and the slide block. Said another end of the pull rod is able to be stopped at the locked position or the released position by virtue of an elastic force provided by the elastic piece. When said another end of the pull rod is stopped at the locked position, the second shell is in the first position. When said another end of the pull rod is stopped at the released position, the second shell is in the second position.

In one embodiment, the mobile terminal further includes a gear pair and a screw rod that are arranged on the first shell, a transmission rod connected with the second shell, and a transmission pin arranged on the transmission rod. The screw rod is provided with a spiral groove cooperated with the transmission pin. The gear pair drives the screw rod into rotation, so that the transmission pin is translated along the spiral groove and thus the second shell is transformed between the first position and the second position.

In one embodiment, when the second shell is in the first position, a slit between the bottom wall of the first shell and the bottom plate of the second shell is of a straight line type or a curved line type.

In one embodiment, when the second shell is in the first position, a slit between the bottom wall of the first shell and the bottom plate of the second shell includes a V-shaped section. An opening of the V-shaped section is oriented towards the second shell.

In one embodiment, the first side perimeter wall and the third side perimeter wall, the second side perimeter wall and the third side perimeter wall, the first side wall and the end wall or the second side wall and the end wall are connected through arc transition.

In one embodiment, the mobile terminal further includes at least one element selected from: infrared lenses, floodlight induction elements, distance sensors, environmental light sensors, loudspeakers, microphones and dot projectors. The at least one element is arranged on the second shell. When the second shall is in the first position, the at least one element is located inside the mobile terminal. When the second shell is slid to the second position, the at least one element can be exposed from the mobile terminal.

In one embodiment, the mobile terminal further includes another camera. Said another camera is arranged on the second shell, and is communicatively connected with a mainboard of the mobile terminal.

In one embodiment, the mobile terminal further includes another camera. Said another camera is arranged on the first shell, and is communicatively connected with a mainboard of the mobile terminal via a flexible circuit board.

Figure 2:
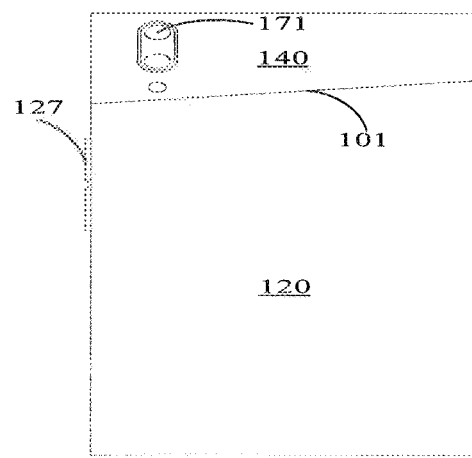
FIG. 2 illustrates a rear view of the mobile terminal illustrated in FIG. 1, where a second shell of a rear housing in the mobile terminal is at a first position.
Figure 3:
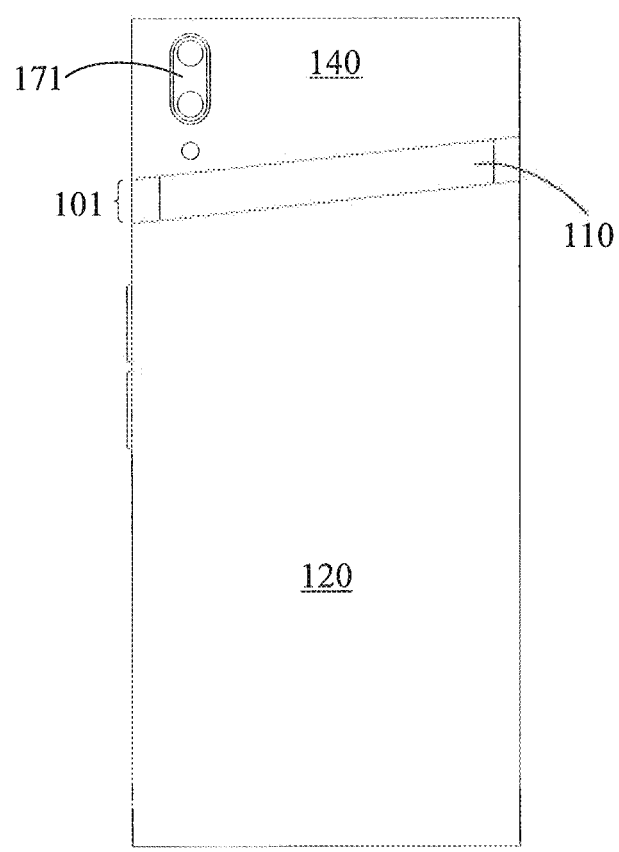
FIG. 3 illustrates another rear view of the mobile terminal illustrated in FIG. 1, where a second shell of a rear housing in the mobile terminal is at a second position.
Figure 4:
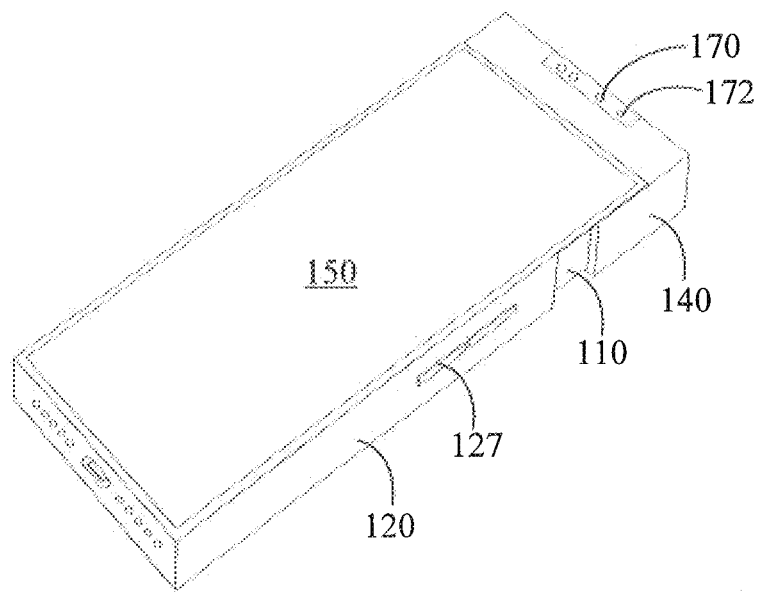
FIG. 4 illustrates a stereoscopic structural schematic diagram of the mobile terminal illustrated in FIG. 3.

As illustrated in FIG. 1 to FIG. 5, a first embodiment of the disclosure describes the mobile terminal specifically with an smart mobile phone as an example. The mobile terminal includes a rear housing 100, a display screen 150 and a camera 170 (illustrated in FIG. 4 and FIG. 5). The display screen 150 is fixedly connected with the rear housing 100. The rear housing 100 includes a first shell 120 and a second shell 140 arranged slidably relative to each other. The second shell 140 can be slid relative to the first shell 120 and has a first position and a second position. Herein, the second shell 140 illustrated in FIG. 1 and FIG. 2 is in the first position, and the second shell 140 illustrated in FIG. 3 and FIG. 4 is in the second position. The camera 170 is arranged on the second shell 140, and an orientation of a light incident surface of the camera 170 is the same as that of the display screen 150.

As illustrated in FIG. 1, when the second shell 140 is in the first position, the camera 170 is blocked inside the mobile terminal. As a result, when a user views information displayed on the display screen 150, the camera 170 cannot be seen and the external light rays cannot enter the light incident surface of the camera 170. As illustrated in FIG. 4, when the second shell 140 is in the second position, under the driving of the second shell 140, the light incident surface of the camera 170 is exposed from the mobile terminal and is not blocked by other components of the mobile terminal. At this moment, the camera 170 can be observed by the user, and the external light rays can also enter the camera 170 via the light incident surface of the camera 170. Therefore, the camera 170 may be used as a front camera, and functions such as a photographing function and a video call are implemented by using the camera 170.

Figure 5:
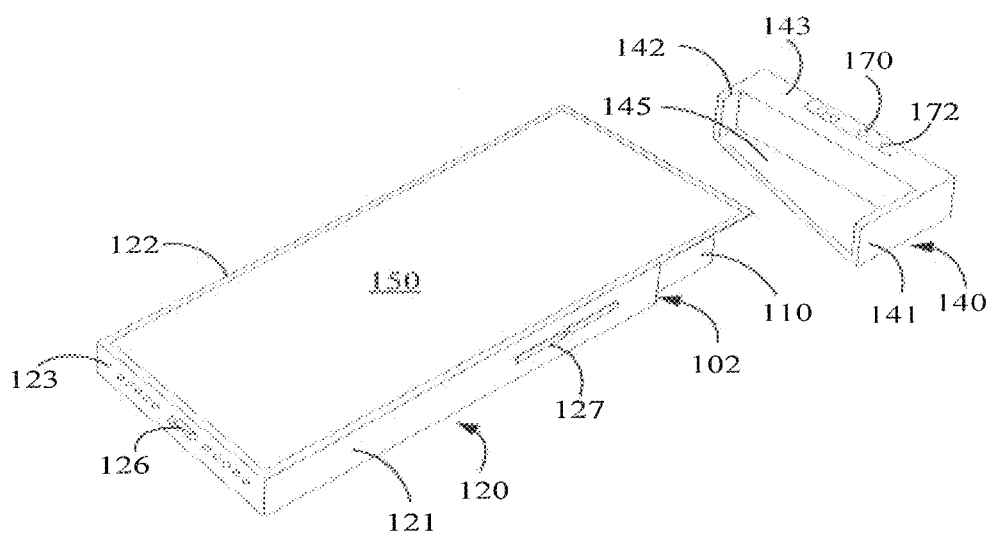
FIG. 5 illustrates a stereoscopic exploded schematic diagram of the mobile terminal illustrated in FIG. 4.

As illustrated in FIG. 5, the first shell 120 includes a bottom wall 125 as well as a first side perimeter wall 121, a second side perimeter wall 122 and a third side perimeter wall 123 extending from three edges of the bottom wall 125. The first side perimeter wall 121 and the second side perimeter wall 122 are arranged opposite to one another and the third side perimeter wall 123 is connected between the first side perimeter wall 121 and the second side perimeter wall 122. Tail end edges of the first side perimeter wall 121, the second side perimeter wall 122 and the third side perimeter wall 123 are flush and are configured to fixedly connect with the display screen 150. The display screen 150 may be connected with the first shell 120 via a plastic strip, and may also be fixedly connected with the first shell 120 via other manners such as a glue. In a process when the mobile terminal is used, relative positions of the display screen 150 and the first shell 120 are not changed. The third side perimeter wall 123 is provided with a connection port 126. The connection port 126 may be configured to connect with an external device. The external device may be, for example, a power device, a headset and the like. A functional button 127 is arranged on the first side perimeter wall 121 and/or the second side perimeter wall 122. The functional button 127 may be a volume adjustment key, a power key and so on.

The second shell 140 includes a bottom plate 145 as well as a first side wall 141, a second side wall 142 and an end wall 143 extending from three edges of the bottom plate 145. The tail end edges of the first side wall 141, the second side wall 142 and the end wall 143 are flush. The first side wall 141 and the second side wall 142 are arranged opposite to one another, and the end wall 143 is connected between the first side wall 141 and the second side wall 142. The end wall 143 is arranged at the edge of one end of the bottom plate 145. Another end of the bottom plate 145, opposite to the end at where the end wall 143 is located, is oriented towards the first shell 120. The camera 170 is arranged on the end wall 143. The second shell 140 is slidably arranged relative to the first shell 120. When the second shell 140 is transformed between the first position and the second position, relative positions of the second shell 140 and the display screen 150 are changed, so that the camera 170 is hidden in the mobile terminal, or is exposed from the mobile terminal. In some embodiments, the mobile terminal further includes at least one functional element 172 selected from: infrared lenses, floodlight induction elements, distance sensors, environmental light sensors, loudspeakers, microphones and dot projectors. The functional element 172 is also arranged on the second shell 140. Specifically, as illustrated in FIG. 5, the functional element 172 is arranged on the end wall 143 of the second shell 140 together with the camera 170. When multiple functional elements 172 are provided, the multiple functional elements 172 may be arranged linearly with the camera 170. The functional element 172 is also transformed between a first position and a second position along with the second shell 140, and thus is hidden in the mobile terminal, or is exposed from the mobile terminal.

Figure 11:
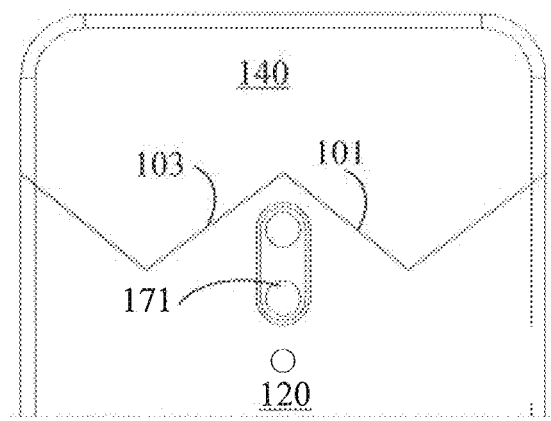

The camera 170 and the functional element 172 may be communicatively connected with a mainboard 190 (FIG. 7) of the mobile terminal via a device such as a flexible circuit board. As illustrated in FIG. 2 and FIG. 3, in one embodiment, the mobile terminal further includes another camera 171 arranged on the second shell 140. In a specific embodiment, said another camera 171 is arranged on an outer surface of the bottom plate 145 of the second shell 140, and an orientation of a light incident surface of said another camera 171 is different from that of the display screen 150. Specifically, the light incident surface of said another camera 171 is arranged opposite to the light incident surface of the camera 170, and said another camera 171 may be used as a rear camera. In other some embodiments, as illustrated in FIG. 11, said another camera 171 may also be arranged on the first shell 120. Specifically, said another camera 171 may be arranged on the bottom wall 125 of the first shell 120, and is communicatively connected with the mainboard 190 of the mobile terminal via the flexible circuit board.

The first shell 120 and the second shell 140 are approximately of a dustpan shape. When the second shell 140 is in the first position, the first shell 120 and the second shell 140 are contacted and are jointly formed an opened box-like structure. Herein, an outer surface of the bottom wall 125 of the first shell 120 is flush with the outer surface of the bottom plate 145 of the second shell 140, an outer surface of the first side perimeter wall 121 of the first shell 120 is flush with an outer surface of the first side wall 141 of the second shell 140, and an outer surface of the second side perimeter wall 122 of the first shell 120 is flush with an outer surface of the second side wall 142 of the second shell 140, so that the appearance integrity of the rear housing 100 is stronger. Tail end edges of the first side perimeter wall 121, the second side perimeter wall 122 and the third side perimeter wall 123 as well as tail end edges of the first side wall 141, the second side wall 142 and the end wall 143 all are located on a same horizontal plane, and are used for jointly bearing the display screen 170.

It may be understood that, as illustrated in FIG. 2, when the first shell 120 and the second shell 140 contact, a slit 101 is formed therebetween. The size of the slit 101 may be different due to different machining precisions. The width of the slit 101 is generally controlled within 0.5 mm. Further, the width is within 0.1 mm. Still further, the width of the slit 101 may be several microns or dozens of microns because of the machining precision and the assembly precision.

Figure 6:
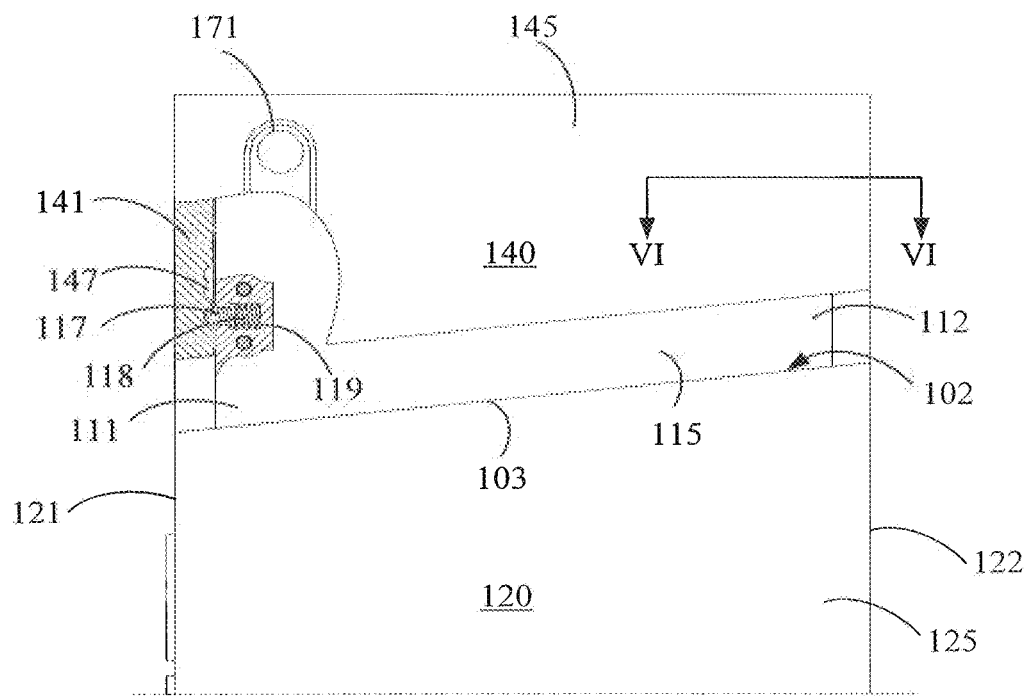
FIG. 6 illustrates a local sectional enlarged schematic diagram of the mobile terminal illustrated in FIG. 3.

When the second shell 140 is moved to the second position, as illustrated in FIG. 3, FIG. 4 and FIG. 6, the width of the slit 101 is increased. At this moment, at least a part of the end wall 143 of the second shell 140 is exposed, so that the camera 170 arranged on the end wall 143 is moved from the inside of the mobile terminal to the outside of the mobile terminal and thus photographing and view finding functions of the camera 170 can be implemented normally.

Figure 7:
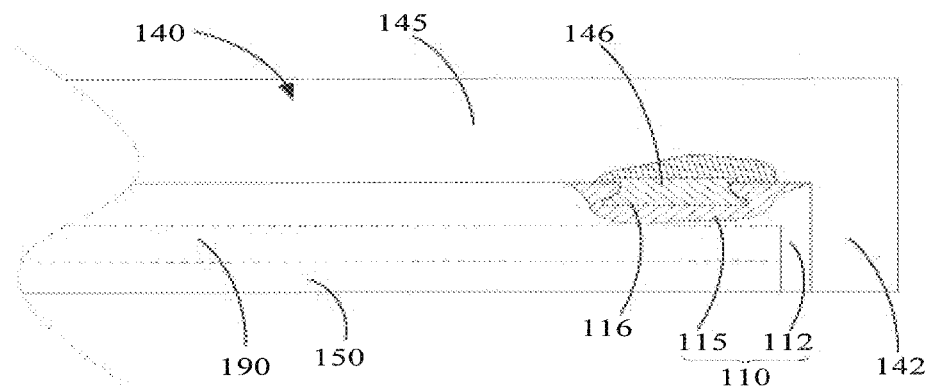
FIG. 7 illustrates a local sectional schematic diagram along a VI-VI line in FIG. 6.

In one embodiment, as illustrated in FIG. 4 and FIG. 5, the rear housing 100 further includes a bearing portion 110 extending from the first shell 120. The bearing portion 110 and the first shell 120 a cooperatively define a receiving space. The thickness of the bearing portion 110 is smaller than that of the first shell 120, so that the receiving space is defined between an outer surface of the bearing portion 110 and an outer surface of the first shell 120. The second shell 140 is slidably arranged with the first shell 120 via the bearing portion 110. For example, a slide rail and a chute cooperated with each other may be formed between the bearing portion 110 and the second shell 140. As illustrated in FIG. 6 and FIG. 7, in one embodiment, a chute 116 is formed on the outer surface of the bearing portion 110, and a corresponding slide rail 146 is formed on an inner surface of the second shell 140. The second shell 140 may be transformed between the first position and the second position along the chute 116. In the first position, the second shell 140 fills and levels up the receiving space, and the second shell 140 surrounds the bearing portion 110. As illustrated in FIG. 2, the second shell 140 fills and levels up the receiving space, which is specifically presented as the second shell 140 and the first shell 120 contact, and the first shell 120 and the second shell 140 are jointly formed an opened box-like structure and jointly bear the display screen 150. The second shell 140 surrounds the bearing portion 110, which should be understood that the second shell 140 covers the bearing portion 110 at least on two planes at an angle to each other. As illustrated in FIG. 5, the second shell 140 surrounds four different directions of the bearing portion 110 because of the bottom plate 145 and the first side wall 141, the second side wall 142 and the end wall 143 extending from three edges of the bottom plate 145 and then forms a full surrounding structure for the bearing portion 110 by virtue of the display screen 150 and the first shell 120. As a result, when the second shell 140 is in the first position, the bearing portion 110 is completely blocked inside the mobile terminal and the user cannot observe the bearing portion 110.

The transformation of the second shell 140 between the first position and the second position may be implemented by a manual operation completely. Further, a stalling structure and a limiting structure may be formed between the second shell 140 and the bearing portion 110. With the stalling structure, the second shell 140 provides a prompt function having a touch feeling after moving in place, so as to notify the user of the second shell 140 reaching to a predetermined position. After the second shell 140 reaches to a limit position, the limiting structure may limit the second shell 140 to move continuously, so that the second shell 140 is prevented from being separated from the first shell 120 and the mobile terminal is prevented from being damaged. FIG. 6 illustrates a stalling structure. The second shell 140 is provided with a clamping groove 147. An elastic piece 118 and an ejector pin 117 are arranged on the bearing portion 110. The elastic piece 118 is elastically rested between the bearing portion 110 and the ejector pin 117. When the second shell 140 is transformed between the first position and the second position, the ejector pin 117 can be slid into or out of the clamping groove 147. More specifically, the clamping groove 147 may be formed on the inner surface of the first side wall 141 of the second shell 140. The ejector pin 117 and the elastic piece 118 may be arranged on the outer surface of the bearing portion 110. In one embodiment, a counter bored hole 119 may be directly formed on the outer surface of the bearing portion 110, so that the ejector pin 117 and the elastic piece 118 are received in the counter bored hole 119. In another optional embodiment, the ejector pin 117 and the elastic piece 118 may further be held by virtue of a fixing block connected with the inner surface of the bearing portion 110. Under such a condition, a penetration hole is formed on the bearing portion 110 so as to penetrate out the ejector pin 117.

The inner surface of the bearing portion 110 may be flush with the inner surface of the first shell 120 so as to place elements such as the mainboard 190 of the mobile terminal. The mainboard 190 may be communicatively connected with the display screen 150, the camera 170, said another camera 171 and the functional element 172 via the device such as the flexible circuit board.

In one embodiment, as illustrated in FIG. 6 and FIG. 7, the bearing portion 110 includes a substrate 115 as well as a first side plate 111 and a second side plate 112 arranged opposite to one another. The substrate 115 is connected between the first side plate 111 and the second side plate 112. The substrate 115 is connected with one end of the bottom wall 125 of the first shell 120 and the thickness of the substrate 115 is smaller than that of the bottom wall 125. The first side plate 111 is connected to the first side perimeter wall 121 of the first shell 120 and the thickness of the first side plate 111 is smaller than that of the first side perimeter wall 121. The second side plate 112 is connected to the second side perimeter wall 122 of the first shell 120 and the thickness of the second side plate 112 is smaller than that of the second side perimeter wall 122. The bearing portion 110 may be integrally molded with the first shell 120. The above receiving space is defined because of a thickness difference between the first shell 120 and the bearing portion 110. An end face 102 is formed at the receiving space defined by the first shell 120 and the bearing portion 110. One end of the bottom plate 145 is arranged on the end wall 143, and another end of the bottom plate 145 is oriented towards the end face 102. In the first position, said another end of the bottom plate 145 is abutted against the end face 102. In the second position, said another end of the bottom plate 145 is separated from the end face 102. As illustrated in FIG. 5, said another end of the bottom plate 145 is a flat surface, so the corresponding end face 102 is also a flat surface. In other embodiments, the end face 102 may be a convexly curved surface protruded toward the second shell 140, and may also be a concavely curved surface sunken opposite to the second shell 140. Correspondingly, the shape of the bottom plate 145 is also matched with the end face 102, so that each place of the slit 101 formed between the second shell 140 and the first shell 120 is consistent in a width.

Figure 8:
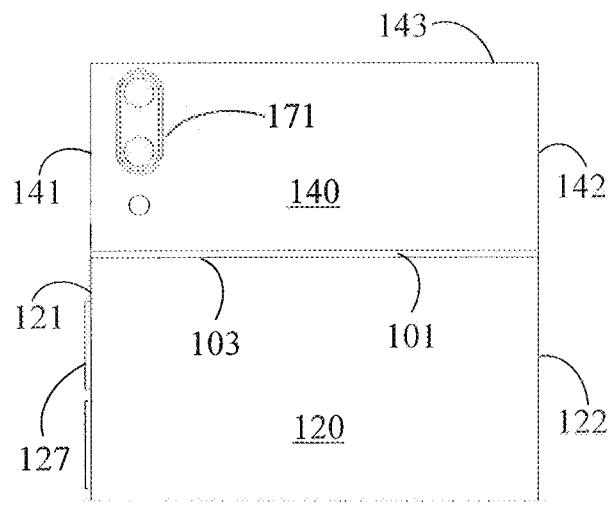
FIG. 8-FIG. 13 illustrate various shapes of first shells and second shells in the mobile terminal provided by the first embodiment.

As illustrated in FIG. 6, an intersecting line 103 of the end face 102 with the outer surface of the bottom wall 125 of the first shell 120 is a straight line. Under such a condition, the slit 101 between the bottom wall 125 of the first shell 120 and the bottom plate 140 of the second shell 145 is of a straight line type. The intersecting line 103 of the end face 102 with the outer surface of the bottom wall 125 may be at an acute angle to the first side perimeter wall 121, and correspondingly, the intersecting line 103 is at an obtuse angle to the second side perimeter wall 122. On the contrary, the intersecting line 103 may be at an obtuse angle to the first side perimeter wall 121, and correspondingly, the intersecting line 103 is at an acute angle to the second side perimeter wall 122. As illustrated in FIG. 8, the intersecting line 103 may also be perpendicular to the first side perimeter wall 121.

Figure 9:
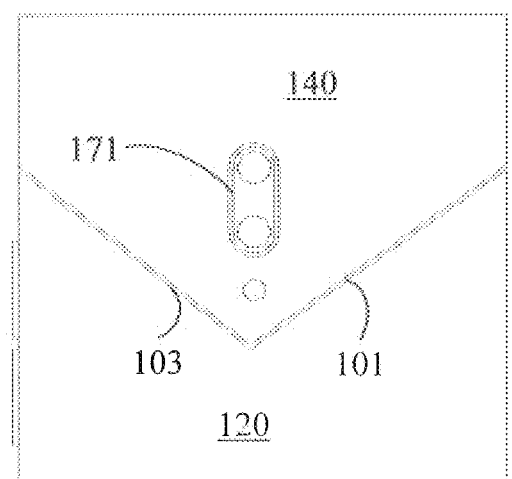
Figure 10:
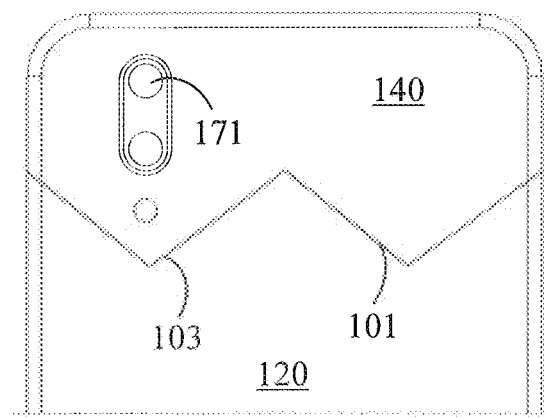
Figure 12:
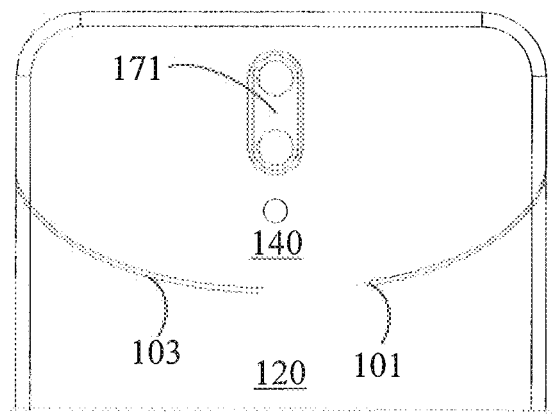
Figure 13:
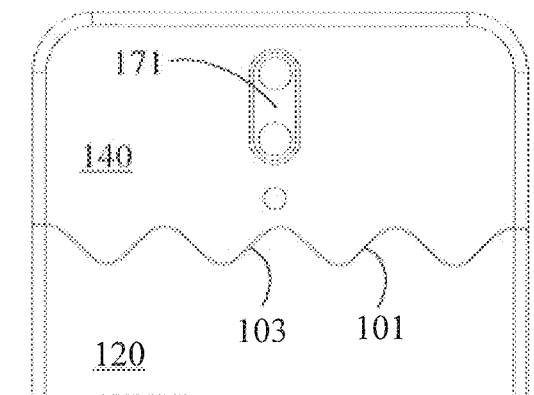

As illustrated in FIG. 9 to FIG. 13, the intersecting line 103 of the end face 102 with the outer surface of the bottom wall 125 of the first shell 120 may also be a curved line, so that the slit 101 between the bottom wall 125 of the first shell 120 and the bottom plate 145 of the second shell 140 is of a curved line type. In some embodiment, the intersecting line 103 of the end face 102 with the outer surface of the bottom wall 125 includes at least two straight lines at an angle to each other. As illustrated in FIG. 9, the intersecting line 103 has two straight lines at an angle to each other, so that the intersecting line 103 is of a V shape. Correspondingly, the slit 101 between the bottom wall 125 and the bottom plate 145 also has a V-shaped section. An opening of the slit 101 on the V-shaped section is oriented towards the second shell 140. As illustrated in FIG. 10 and FIG. 11, the intersecting line 103 has four straight lines, which are connected in sequence, and two adjacent lines of which are at an angle to each other, so that the intersecting line 103 is of a W shape. Correspondingly, the slit 101 between the bottom wall 125 and the bottom plate 145 also has a W-shaped section. As illustrated in FIG. 12, the intersecting line 103 is approximately of a C shape. Correspondingly, the slit 101 between the bottom wall 125 and the bottom plate 145 also has a C-shaped section. As illustrated in FIG. 13, the intersecting line 103 is of an S shape having multiple arc sections. Correspondingly, the slit 101 between the bottom wall 125 and the bottom plate 145 also has an S-shaped section.

In the embodiments illustrated in FIG. 1 to FIG. 5, the first side perimeter wall 121 and the third side perimeter wall 123 of the first shell 120, the second side perimeter wall 122 and the third side perimeter wall 123, as well as the first side wall 141 and the end wall 143 of the second shell 140, and the second side wall 142 and the end wall 143 are in right-angled connection. In other embodiments, as illustrated in FIG. 10 to FIG. 13, each side perimeter wall of the first shell 120, or each side wall and the end wall of the second shell 140 may also be connected through arc transition.

The bearing portion 110 in the above embodiment extends from the first shell 120. In other embodiments, the bearing portion 110 may also extend from the second shell 140. That is, the substrate 115 of the bearing portion 110 is connected with the bottom plate 145 of the second shell 140. The first side plate 111 of the bearing portion 110 is connected to the first side wall 141 of the second shell 140, and the second side plate 112 of the bearing portion 110 is connected to the second side wall 142 of the second shell 140. Due to the transformation of the position where the bearing portion 110 is formed, the second shell 140 and the bearing portion 110 define a receiving space correspondingly. An end face is formed at the receiving space, and the end face is intersected with the outer surface of the second shell 140 to form an intersecting line. When the second shell 140 is in the first position, the edge at one end of the bottom wall 125 of the first shell 120 is abutted against the end face, and the first shell 120 fills and levels up the receiving space and surrounds the bearing portion 110. When the second shell 140 is in the second position, the edge at one end of the bottom wall 125 of the first shell 120 is separated from the end face, so that at least a part of the bearing portion 110 is exposed. Other settings may be changed correspondingly due to a change in the position where the bearing portion 110 is formed. However, the settings not affected by the change in the position where the bearing portion 110 is formed are the same as the above embodiment and will not be repeated here.

Figure 14:
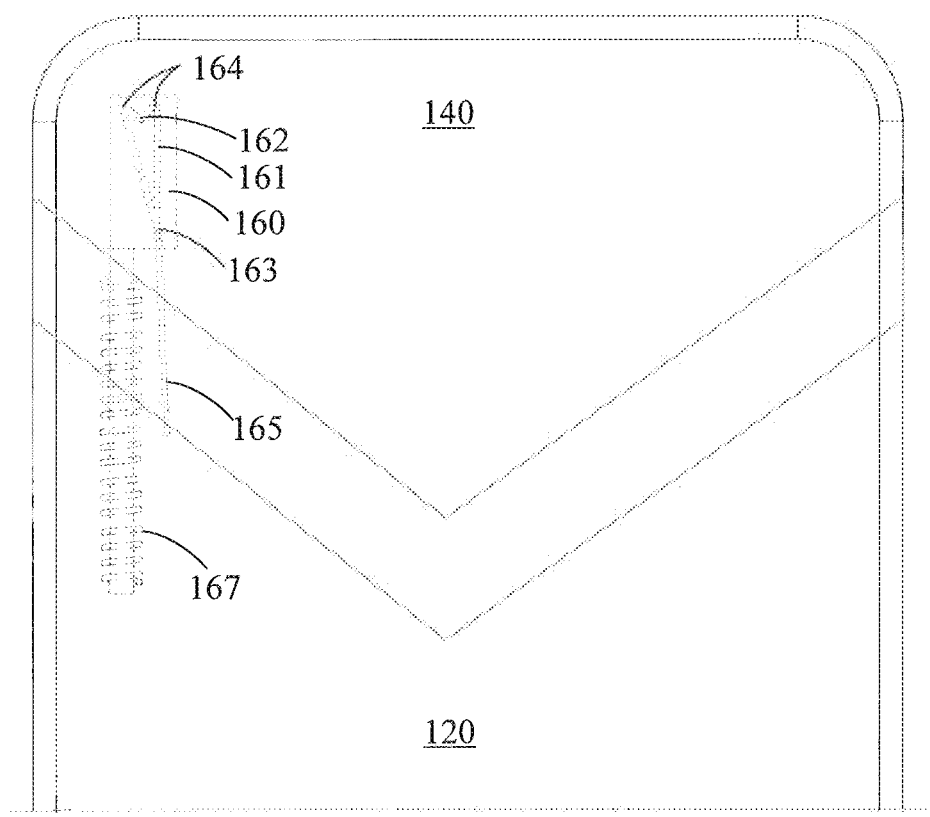
FIG. 14 and FIG. 15 illustrate a first type of transmission mechanism configured by a first shell and a second shell in a mobile terminal.
Figure 15:
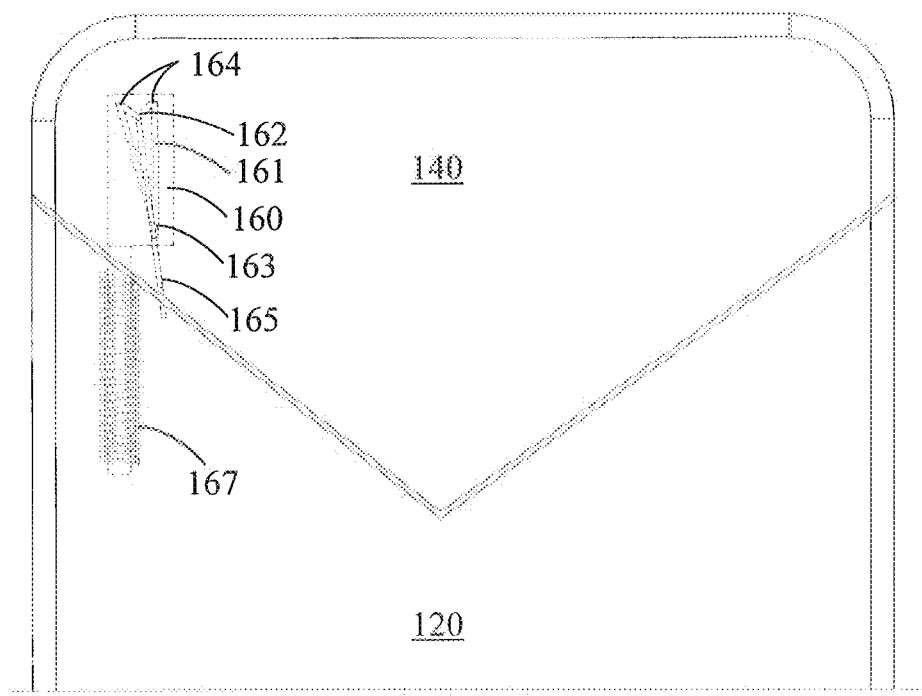
Figure 16:
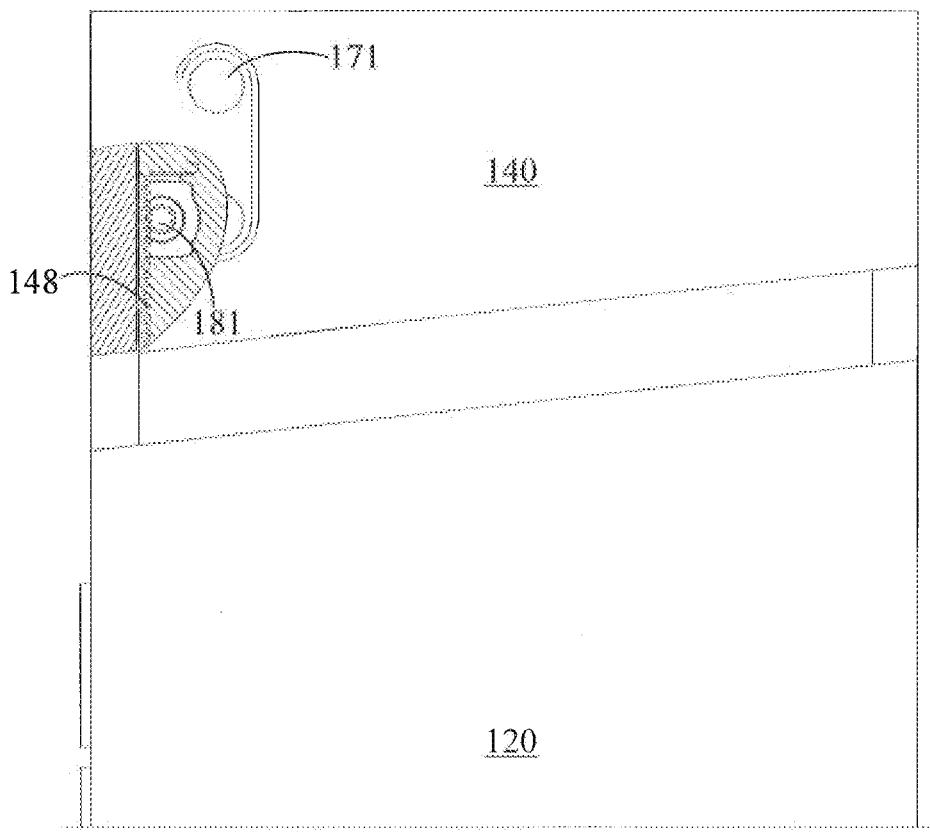
FIG. 16 and FIG. 17 illustrate a second type of transmission mechanism configured by a first shell and a second shell in a mobile terminal.
Figure 17:
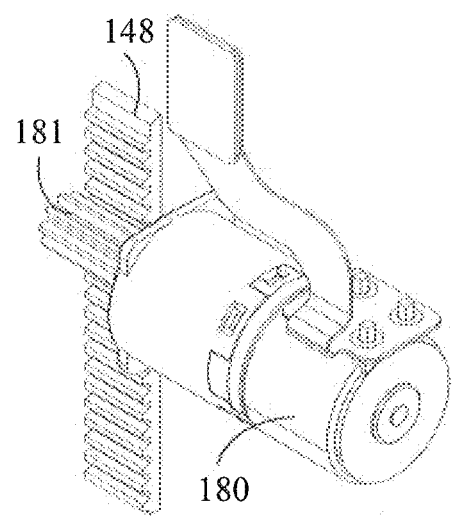
Figure 18:
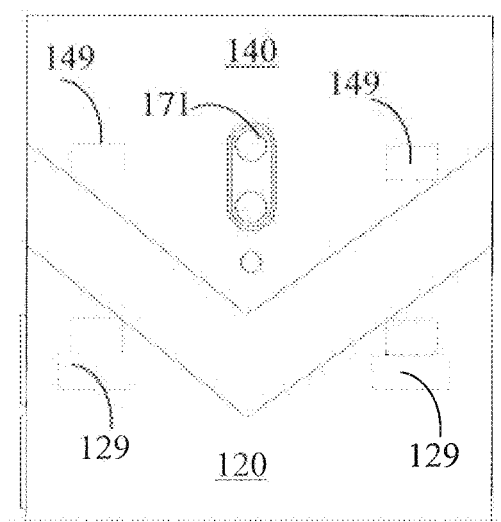
FIG. 18 and FIG. 19 illustrate a third type of transmission mechanism configured by a first shell and a second shell in a mobile terminal.
Figure 19:
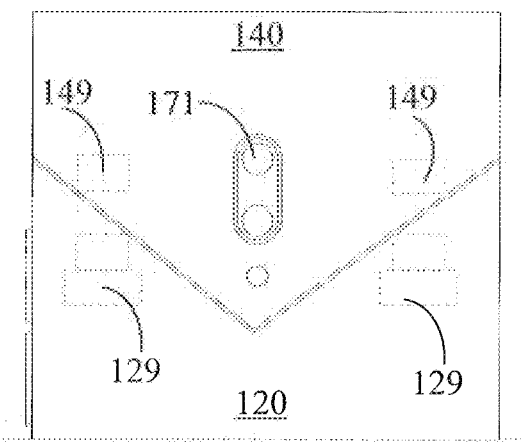
Figure 20:
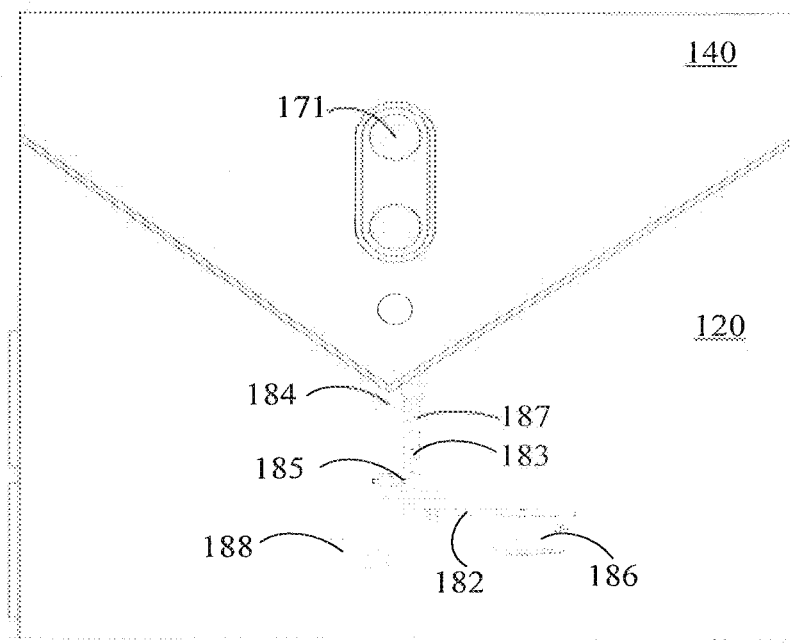
FIG. 20 and FIG. 21 illustrate a fourth type of transmission mechanism configured by a first shell and a second shell in a mobile terminal.
Figure 21:
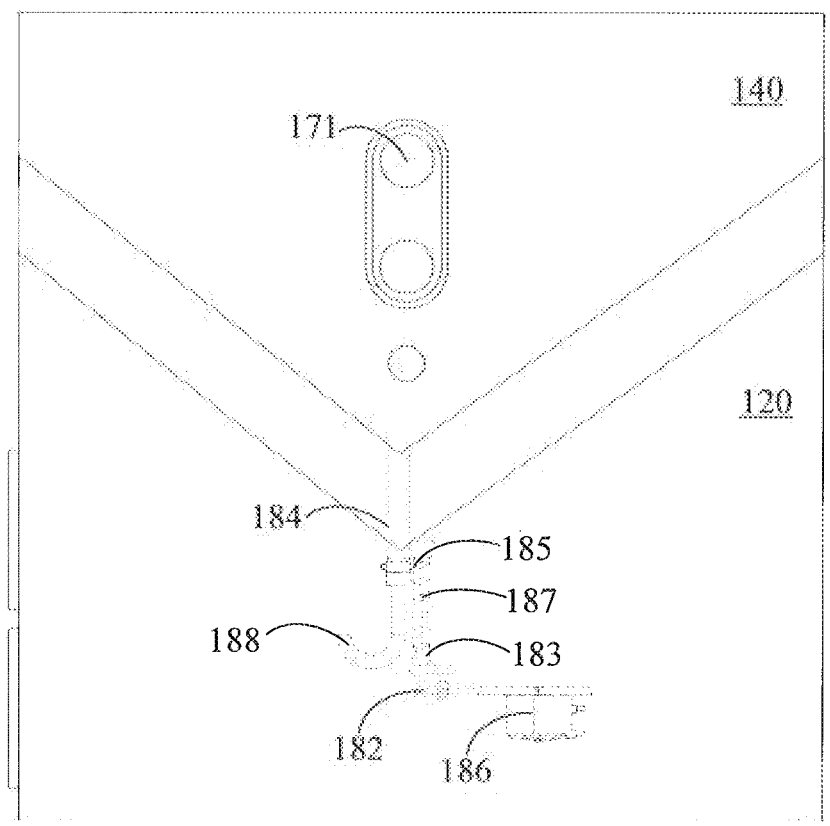

The transformation of the second shell 140 between the first position and the second position may be implemented completely via the manual operation and may further be implemented by virtue of an auxiliary transmission mechanism. FIG. 14 to FIG. 21 illustrates different types of transmission mechanisms, in which FIG. 14 to FIG. 15 illustrates a first type of transmission structure, FIG. 16 to FIG. 17 illustrates a second type of transmission structure, FIG. 18 to FIG. 19 illustrates a third type of transmission structure and FIG. 20 to FIG. 21 illustrates a fourth type of transmission structure. In different embodiments, the mobile terminal may select different transmission mechanisms as required to implement the movement of the second shell 140 relative to the first shell 120.

As illustrated in FIG. 14 and FIG. 15, the mobile terminal further includes a slide block 160, a pull rod 165 and an elastic piece 167. The slide block 160 is arranged on the second shell 140. The slide block 160 may be moved together with the second shell 140, and the slide block 160 and the second shell 140 do not generate relative movement therebetween. The slide block 160 is in sliding fit with the first shell 120. For example, one end, toward the first shell 120, of the slide block 160 may extend to form a slide bar. A corresponding slide hole is formed on the first shell 120. The slide bar is cooperated with the slide hole and may guide the slide block 160 to slide relative to the first shell 120.

The slide block 160 is provided with a quasi-heart-shaped groove 161. The quasi-heart-shaped groove 161 has a locked position 162 and a released position 163. Herein, the released position 163 is located on an end portion, nearest to the first shell 120, of the quasi-heart-shaped groove 161, and the locked position 162 is far away from the first shell 120 and is located at an outline sunken place of the quasi-heart-shaped groove 161. The quasi-heart-shaped groove 161 is further provided with two limit positions 164, which are respectively located at two sides of the locked position 162 and are positions furthest to the first shell 120 in the quasi-heart-shaped groove 161.

One end of the pull rod 165 is pivotally connected to the first shell 120. For example, a cooperation hole may be formed at a corresponding position of the first shell 120, such as on the inner surface of the bottom wall 125 of the first shell 120, and one end of the pull rod 165 may be rotatably spliced to the cooperation hole. Another end of the pull rod 165 is movably arranged in the quasi-heart-shaped groove 161. Herein, as illustrated in FIG. 14, when said another end of the pull rod 165 is stopped at the released position 163, the second shell 140 is in the second position. Herein, as illustrated in FIG. 15, when said another end of the pull rod 165 is stopped at the locked position 162, the second shell 140 is in the first position.

The elastic piece 167 is compressively arranged between the first shell 120 and the slide block 160. By virtue of an elastic force provided by the elastic piece 167, the slide block 160 (i.e., the second shell 140) has a tendency of moving far away from the first shell 120. Since said another end of the pull rod 165 is cooperated with the quasi-heart-shaped groove 161, a pull force of the pull rod 165 may form a balance with the elastic force of the elastic piece 167. When no external force is intervened, the pull rod 165 may be stopped at the locked position 162 or the released position 163, that is, the second shell 140 is stopped at the first position or the second position. When there is a need to transform the second shell 140 from the second position in FIG. 14 to the first position in FIG. 15, the user may press the second shell 140 to overcome the elastic force provided by the elastic piece 167, so that the second shell 140 is moved toward the first shell 120. During this process, the corresponding end portion of the pull rod 165 is moved from the released position 163 and passes through the limit position 164 till the locked position 162 in the quasi-heart-shaped groove 161. When there is a need to transform the second shell 140 from the first position in FIG. 15 to the second position in FIG. 14, the user may press the second shell 140, so that the corresponding end portion of the pull rod 165 is disturbed to separate from the locked position 162. After the limit position 164 is passed, the user does not need to apply an external force again. The second shell 140 may reach to the second position via the elastic force provided by the elastic piece 167, that is, under the action of the elastic force of the elastic piece 167, the pull rod 165 may reach to the locked position 162 from the limit position 164.

As the disturbance generated by pressing the second shell 140 in the first position is limited, a distance between the limit position 164 and the locked position 162 along the movement direction of the second shell 140 cannot be too large, or otherwise, the corresponding end portion of the pull rod 165 cannot be separated from the locked position 162 successfully and get over the limit position 164. In view of such a condition, in some embodiments, the slide block 160 and the second shell 140 may further be configured to be able to move relatively, and a corresponding button is arranged on the second shell 140. The button is exposed from the second shell 140. By pressing the button, the slide block 160 may move an enough distance, and thus the corresponding end portion of the pull rod 165 moves from the locked position 162 to get over the limit position 164 and the smooth transformation of the second shell 140 between the first position and the second position is guaranteed.

In some embodiments, a step may further be formed along a certain direction at the bottom of the quasi-heart-shaped groove 161, so that the pull rod 165 only can move along a given direction in the quasi-heart-shaped groove 161 and cannot move beyond the step to move towards a reverse direction.

As illustrated in FIG. 16 and FIG. 17, in one embodiment, the mobile terminal further includes a motor 180. The motor 180 may be fixed on the first shell 120. The motor 180 may also be fixedly connected with the first shell 120 by virtue of other elements, and for example, may be arranged on the bearing portion 110. An output shaft of the motor 180 is provided with a gear 181. The second shell 140 is provided with a rack 148. The rack 148 and the gear 181 are cooperated in such a way that the operation of the motor 180 drives the second shell 140 to slide relative to the first shell 120. The rack 148 may be arranged on a certain sidewall of the second shell 140, and may also be arranged on the bottom plate 145 of the second shell 140, which may be determined by a fixed position of the motor 180 and an orientation of the output shaft of the motor 180. Through a circuit board, the mainboard 190 may be communicatively connected with the motor 180, and the operation time and the operation direction of the motor 180 may be controlled, so that the second shell 140 is transformed between the first position and the second position.

As illustrated in FIG. 18 and FIG. 19, in one embodiment, the second shell 140 is provided with a magnetic piece 149. The magnetic piece 149 may be various types of magnets, and the polarity toward the first shell 120 is stable and unchanged. The first shell 120 is provided with an electromagnet 129. The polarity of the electromagnet 129 toward the first shell 120 is changeable. For example, the polarity of the electromagnet 129 may be changed by enabling the mainboard 190 to change a current direction of the electromagnet 129. The electromagnet 129 is correspondingly arranged with the magnetic piece 149, and generates an attractive force or a repulsive force for the magnetic piece 140 according to different polarities of the electromagnet 129, so that the second shell 140 may be driven to generate a relative motion relative to the first shell 120, and thus the second shell 140 is transformed between the first position and the second position.

As illustrated in FIG. 20 and FIG. 21, in one embodiment, the mobile terminal further includes a gear pair 182, a screw rod 183, a transmission rod 184 and a transmission pin 185. The gear pair 182 and the screw rod 183 are arranged on the first shell 120, and the rotation of the gear pair 182 can drive the screw rod 183 into rotation. The screw rod 183 is provided with a spiral groove 187. The gear pair 182 may be driven by a driving piece 186 such as the motor. The gear pair 182 may be formed by a two-stage or multi-stage gear transmission mechanism, so as to reduce the occupied space on the premise of meeting the required transmission ratio. The transmission rod 184 is connected with the second shell 140. The transmission pin 185 is arranged on the transmission rod 184. The transmission pin 185 is cooperated with the spiral groove 187 on the screw rod 183. When the gear pair 182 is rotated, the screw rod 183 may be driven into rotation, and the transmission pin 185 embedded into the spiral groove 187 is driven to implement a translation along the spiral groove 187, so that the second shell 140 may be translated relative to the first shell 120. By controlling the rotation direction of the gear pair 182, the second shell 140 may be transformed between the first position and the second position. The transmission rod 184 may be configured to be a hollow structure so as to pass through the flexible circuit board 188 and then enable the flexible circuit board 188 to conduct the cameras 170, 171 on the second shell 140 and the mainboard 190 in the first shell 120.

Figure 22:
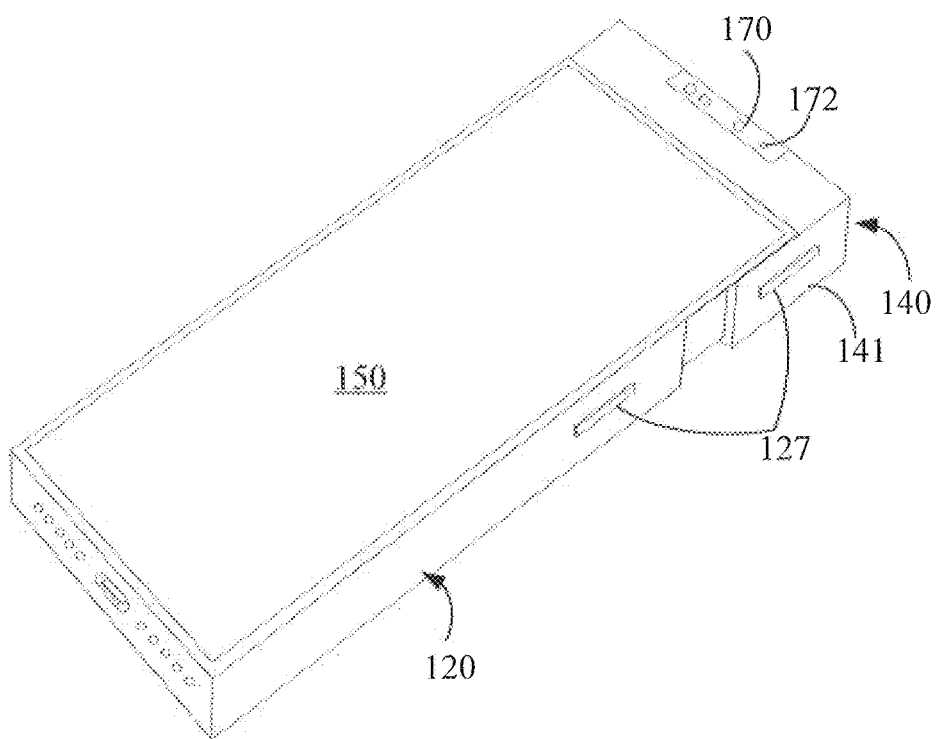
FIG. 22 illustrates a stereoscopic structural schematic diagram of a mobile terminal provided by a second embodiment of the disclosure.

FIG. 22 illustrates a mobile terminal provided by a second embodiment of the disclosure. The difference of this mobile terminal from the mobile terminal in the above embodiment is that the functional button 127 may be arranged on the second shell 140. For example, the functional button 127 is arranged on the first side wall 141 of the second shell 140, may also be arranged on the second side wall 142 of the second shell 140, or is simultaneously arranged on the first side wall 141 and the second side wall 142.

Figure 23:
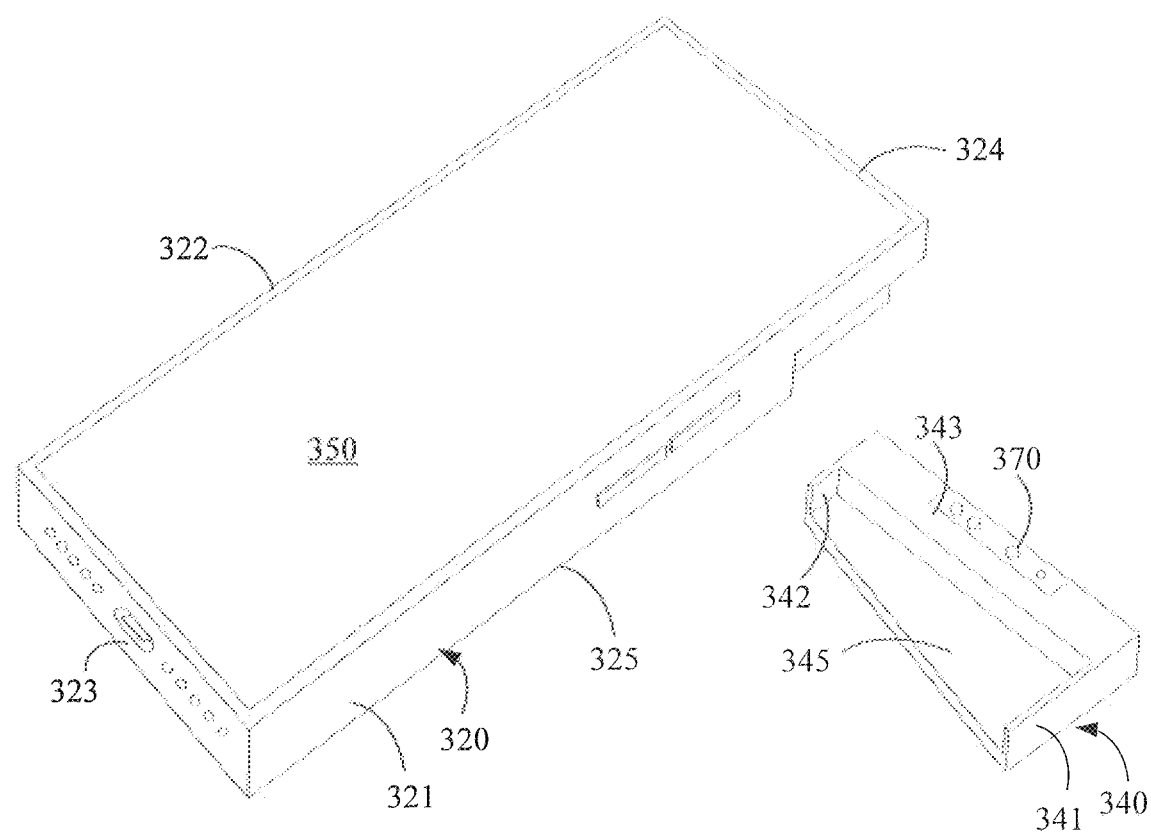
FIG. 23 illustrates a stereoscopic exploded schematic diagram of a mobile terminal provided by a third embodiment of the disclosure.

FIG. 23 illustrates a mobile terminal provided by a third embodiment of the disclosure. The mobile terminal also includes a rear housing, a display screen 350 and a camera 370. The rear housing includes a first shell 320 and a second shell 340 arranged slidably relative to each other. The second shell 340 includes a bottom plate 345 as well as a first side wall 341, a second side wall 342 and an end wall 343 extending from three edges of the bottom plate 345. The tail end edges of the first side wall 341, the second side wall 342 and the end wall 343 are flush. The first side wall 341 and the second side wall 342 are arranged opposite to one another, and the end wall 343 is connected between the first side wall 341 and the second side wall 342. The end wall 343 is arranged at the edge of one end of the bottom plate 345. Another end of the bottom plate 345, opposite to the end at where the end wall 343 is located, is oriented towards the first shell 320. The camera 370 is arranged on the end wall 343. The first shell 320 includes a bottom wall 325 as well as a first side perimeter wall 321, a second side perimeter wall 322 and a third side perimeter wall 323 extending from three edges of the bottom wall 325. The first side perimeter wall 321 and the second side perimeter wall 322 are arranged opposite to one another and the third side perimeter wall 323 is connected between the first side perimeter wall 321 and the second side perimeter wall 322. The difference is that the first shell 320 further includes a fourth side perimeter wall 324. The fourth side perimeter wall 324 is connected between the first side perimeter wall 321 and the second side perimeter wall 322. Tail end edges of the first side perimeter wall 321, the second side perimeter wall 322, the third side perimeter wall 323 and the fourth side perimeter wall 324 are flush, are located in a same horizontal plane and are simultaneously connected with the display screen 350.

In the first position, an outer surface of the end wall 343 of the second shell 340 is flush with an outer surface of the fourth side perimeter wall 324 of the first shell 320. In the second position, an outer surface of the end wall 343 of the second shell 340 is unaligned with the outer surface of the fourth side perimeter wall 324.

Figure 24:
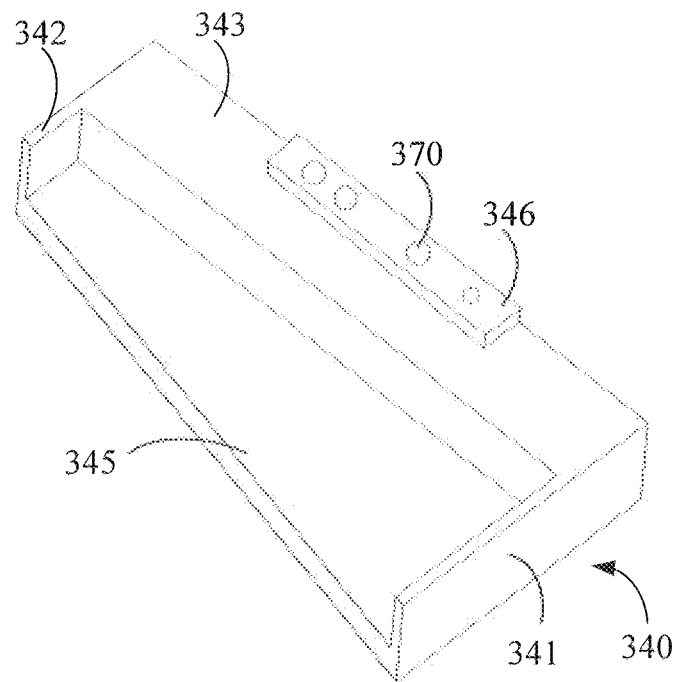
FIG. 24 illustrates another variant structural schematic diagram of a second shell in the mobile terminal illustrated in FIG. 23.
Figure 25:
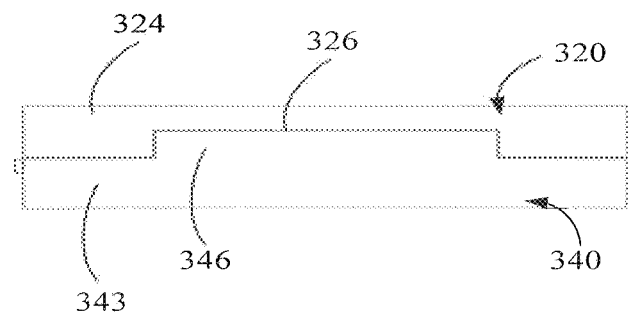
FIG. 25 illustrates an end view after a second shell and a corresponding first shell are cooperated in the mobile terminal illustrated in FIG. 24.

Further, as illustrated in FIG. 24, a protrusion 346 may further be arranged on the end wall 343 of the second shell 340. The protrusion 346 is relatively protruded from the surface of the end wall 343. The camera 370 is arranged on the end wall 346. As illustrated in FIG. 25, a gap 326 corresponding to the protrusion 346 is formed on the fourth side perimeter wall 324 of the first shell 320. In the first position, the protrusion 346 is received in the gap 326.

Other characteristics not mentioned in the mobile terminal provided by the third embodiment may be the same as the first embodiment and the second embodiment and thus will not be repeated.

Figure 26:
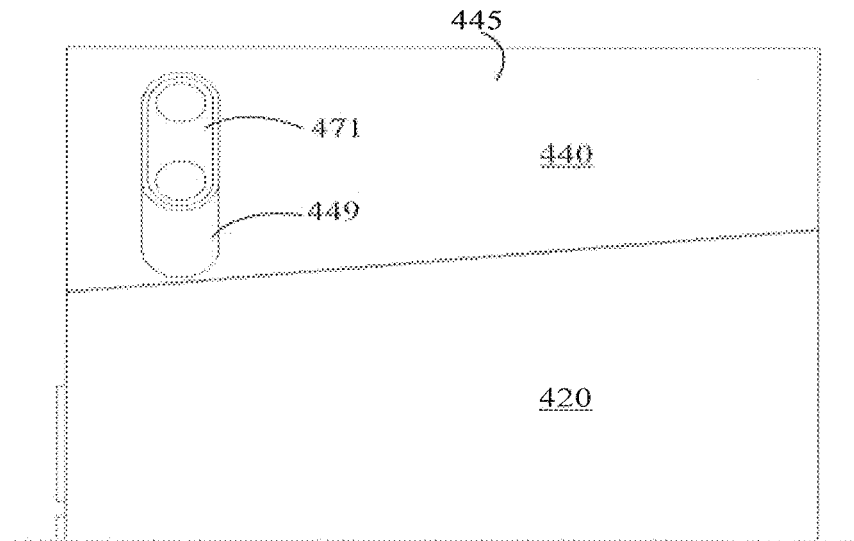
FIG. 26 illustrates a local rear-view schematic diagram of a mobile terminal provided by a fourth embodiment of the disclosure, where a second shell of a rear housing in the mobile terminal is at a first position.
Figure 27:
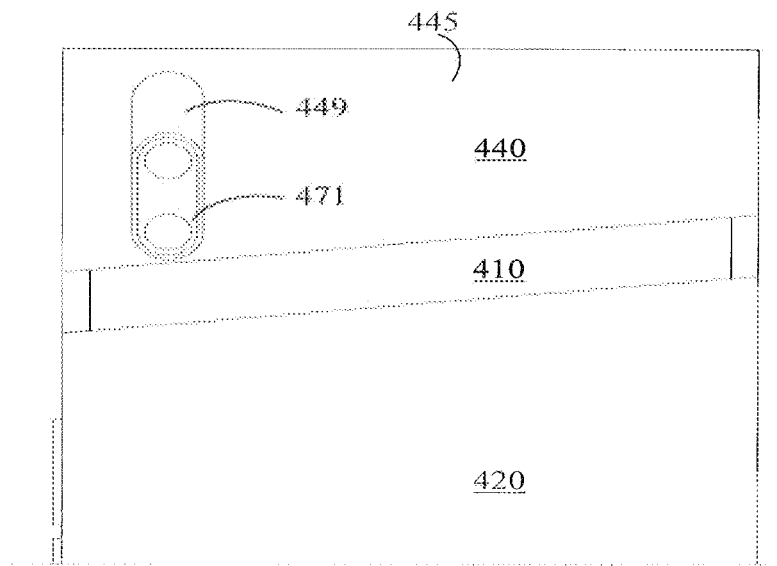
FIG. 27 illustrates another rear view of the mobile terminal illustrated in FIG. 26, where a second shell of a rear housing in the mobile terminal is at a second position.

FIG. 26 and FIG. 27 illustrate a mobile terminal provided by a fourth embodiment of the disclosure. The mobile terminal is approximately the same as the mobile terminal provided by the first embodiment. The difference is that a camera 471 used as a rear camera does not move together with a second shell 440 as the first embodiment, but is arranged on a first shell 420 and is fixedly connected with the first shell 420, and does not change the position in a movement process of the second shell 440. For example, the camera 471 may be fixed on the bearing portion 410. A bottom plate 445 of the second shell 440 is provided with a through hole 449, and the camera 471 is exposed from the through hole 449.

Figure 28:
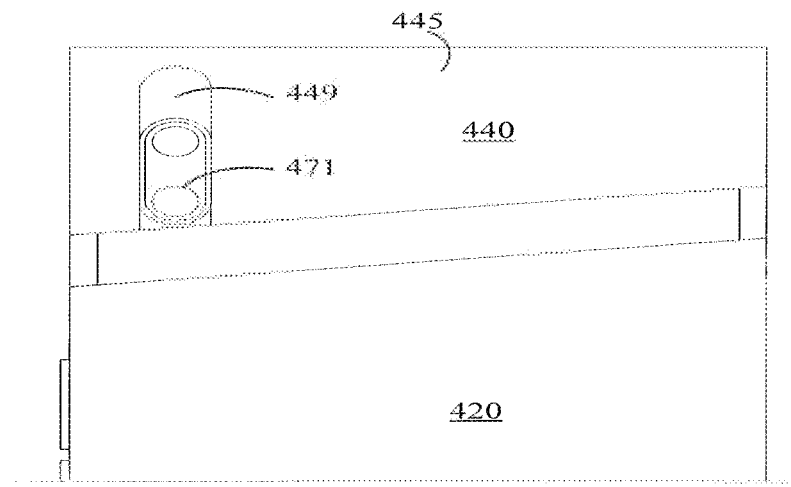
FIG. 28 illustrates another variant structural schematic diagram of the mobile terminal illustrated in FIG. 27.

The through hole 449 extends along a movement direction of the second shell 440, and its extension length is greater than or equal to a displacement distance of the second shell 440 from the first position to the second position As illustrated in FIG. 28, the through hole 449 may further penetrate through one end of the bottom plate 445 closer to the first shell 420.

Figure 29:
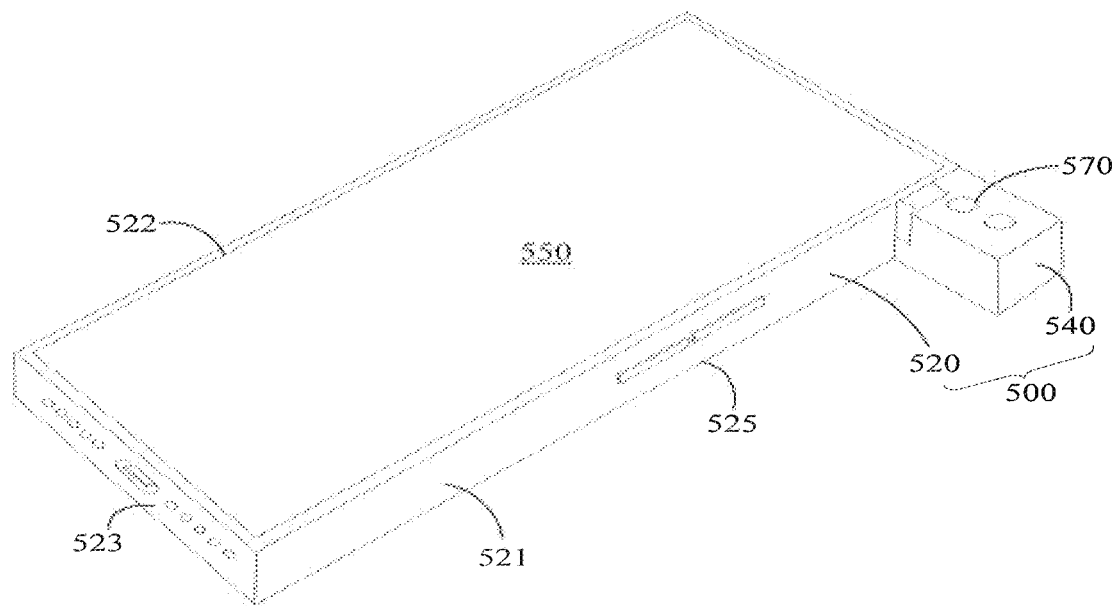
FIG. 29 illustrates a stereoscopic structural schematic diagram of a mobile terminal provided by a fifth embodiment of the disclosure.
Figure 30:
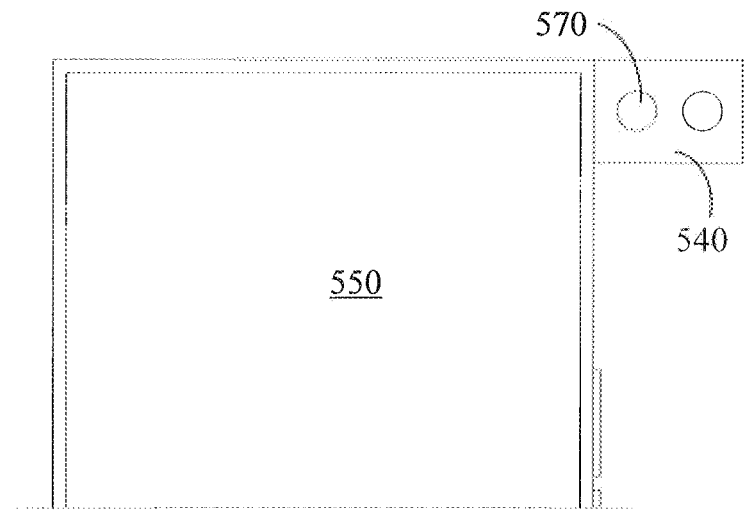
FIG. 30 illustrates a local front-view schematic diagram of the mobile terminal illustrated in FIG. 29.

FIG. 29 to FIG. 34 is a mobile terminal provided by a fifth embodiment of the disclosure. As illustrated in FIG. 29 and FIG. 30, the mobile terminal includes a rear housing 500, a display screen 550 and a camera 570. The rear housing 500 includes a first shell 520 and a second shell 540 arranged slidably relative to each other. The second shell 540 can be slid relative to the first shell 520 and has a first position and a second position. Herein, the second shell 540 illustrated in FIG. 29 is in the second position. The camera 570 is arranged on the second shell 540, and an orientation of a light incident surface of the camera 570 is the same as that of the display screen 550. When the second shell 540 is in the second position, the light incident surface of the camera 570 is exposed from the mobile terminal. At this moment, the camera 570 can be observed by the user, and the external light rays can also enter the camera 570 via the light incident surface of the camera 570. Therefore, the camera 570 may be used as a front camera, and functions such as a photographing function and a video call are implemented by using the camera 570. When the second shell 540 is in the first position, the camera 570 is blocked inside the mobile terminal. As a result, when the user views information displayed on the display screen 550, the camera 570 cannot be seen and the external light rays cannot enter the light incident surface of the camera 570.

As illustrated in FIG. 29, the first shell 520 includes a bottom wall 525 as well as a first side perimeter wall 521, a second side perimeter wall 522 and a third side perimeter wall 523 extending from three edges of the bottom wall 525. The first side perimeter wall 521 and the second side perimeter wall 522 are arranged opposite to one another and the third side perimeter wall 523 is connected between the first side perimeter wall 521 and the second side perimeter wall 522. Tail end edges of the first side perimeter wall 521, the second side perimeter wall 522 and the third side perimeter wall 523 are flush and are configured to fixedly connect with the display screen 550.

Figure 33:
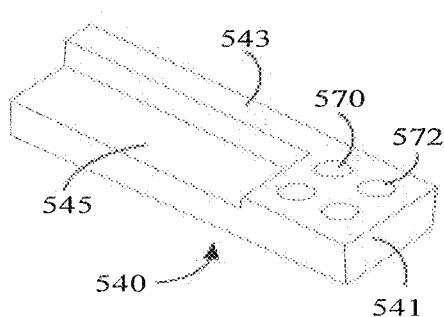
FIG. 33 illustrates a stereoscopic structural schematic diagram of a second shell in the mobile terminal illustrated in FIG. 29.

As illustrated in FIG. 33, the second shell 540 includes a bottom plate 545 as well as a side wall 541 and an end wall 543 extending from two adjacent edges of the bottom plate 545. The end wall 543 is arranged at the edge of one end of the bottom plate 545. Another end of the bottom plate 545, opposite to the end at where the end wall 543 is located, is oriented towards the third side perimeter wall 523 of the first shell 520. The camera 570 is arranged on the side wall 541. The side wall 541 and the second side perimeter wall 522 are arranged opposite to one another. Tail end edges of the first side perimeter wall 521, the second side perimeter wall 522, the side wall 541 and the end wall 543 are flush, and jointly bear the display screen 550 in the first position.

When the second shell 540 is stopped in the first position, an outer surface of the first side perimeter wall 521 is flush with an outer surface of the side wall 541. The first shell 520 and the second shell 540 are of an opened box-like shape and jointly bear the display screen 550. The camera 570 is blocked by other components of the mobile terminal to hide in the mobile terminal.

As illustrated in FIG. 29 and FIG. 30, when the second shell 540 is stopped at the second position, the side wall 541 is unaligned with the first side perimeter wall 521, and the camera 570 moves along with the second shell 540 and is exposed from the mobile terminal from a side where the first side perimeter wall 521 is located. As illustrated in FIG. 33, the mobile terminal further includes at least one functional element 572 selected from: infrared lenses, floodlight induction elements, distance sensors, environmental light sensors, loudspeakers, microphones and dot projectors. The functional element 572 is also arranged on the side wall 541 of second shell 540. The functional element 572 is also transformed between a first position and a second position along with the second shell 540 and thus is hidden in the mobile terminal, or is exposed from the mobile terminal. When two or more functional elements 572 are provided, the functional elements 572 and the camera 570 are in a nonlinear arrangement, such as a matrix arrangement.

Figure 31:
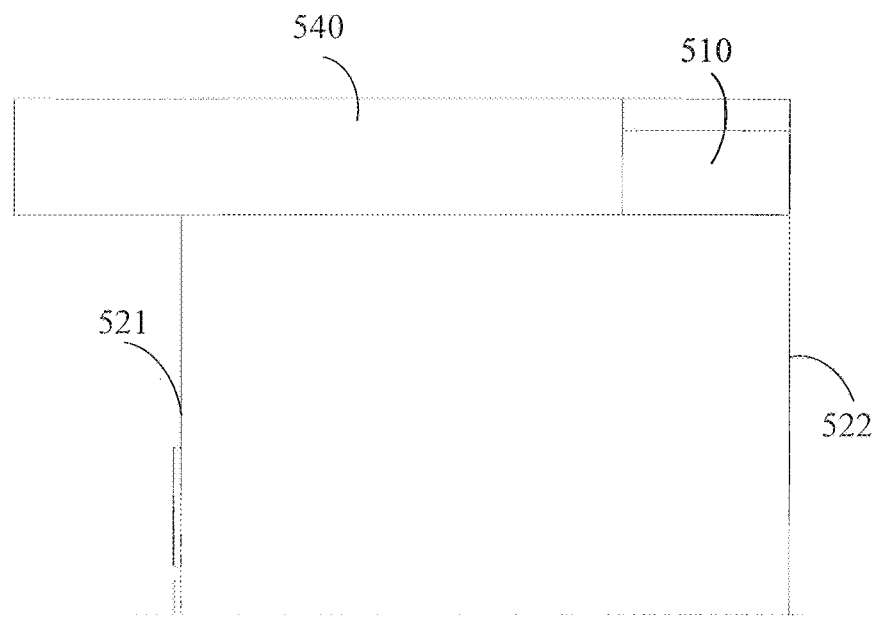
FIG. 31 illustrates a local rear-view schematic diagram of the mobile terminal illustrated in FIG. 29.
Figure 32:
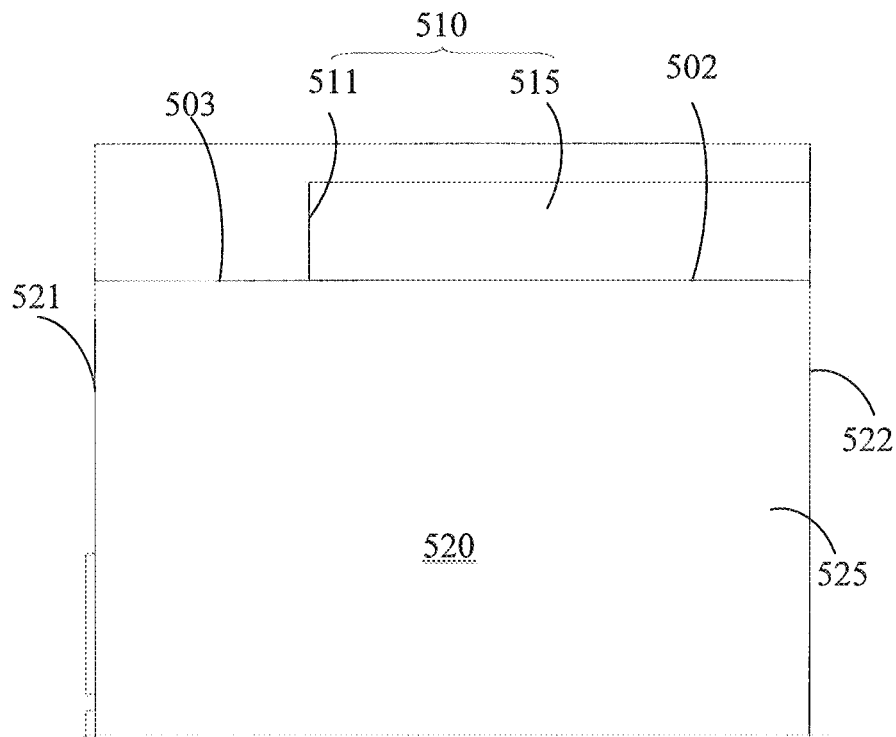
FIG. 32 illustrates a rear-view schematic diagram of other structures, except for a second shell, in the mobile terminal illustrated in FIG. 29.

As illustrated in FIG. 31 and FIG. 32, the rear housing 500 further includes a bearing portion 510 extending from the first shell 520. The bearing portion 510 and the first shell 520 cooperatively define a receiving space. The thickness of the bearing portion 510 is smaller than that of the first shell 520, so that the receiving space is defined between an outer surface of the bearing portion 510 and an outer surface of the first shell 520. An end face 502 is formed at the receiving space defined by the first shell 520 and the bearing portion 510. An intersecting line 503 of the end face 502 with an outer surface of the bottom wall 525 is a straight line. The end face 502 may be a flat surface or a curved surface. When being the curved surface, the end face 502 may be a convexly curved surface convexly stretched toward the second shell 540, or a concavely curved surface sunken toward a reverse direction.

The second shell 540 is slidably arranged on the bearing portion 510 and can move along a direction parallel to the end face 502. In the first position, the second shell 540 fills and levels up the receiving space, and the second shell 540 surrounds the bearing portion 510. In the second position, the second shell 540 exposes at least a part of the bearing portion 510 due to the movement. No matter whether in the first position or in the second position, the opposite other end of the bottom plate 545 is abutted against at least a part of the end face 502.

As illustrated in FIG. 32, the bearing portion 510 includes a substrate 515 and a side plate 511 extending from one edge of the substrate 515. The other edge of the substrate 515 is connected with the second side perimeter wall 522. A certain space is provided between the side plate 511 and the first side perimeter wall 512, so that the second shell 540 is configured to hold the side wall 541 of the second shell 540 in the first position.

Figure 34:
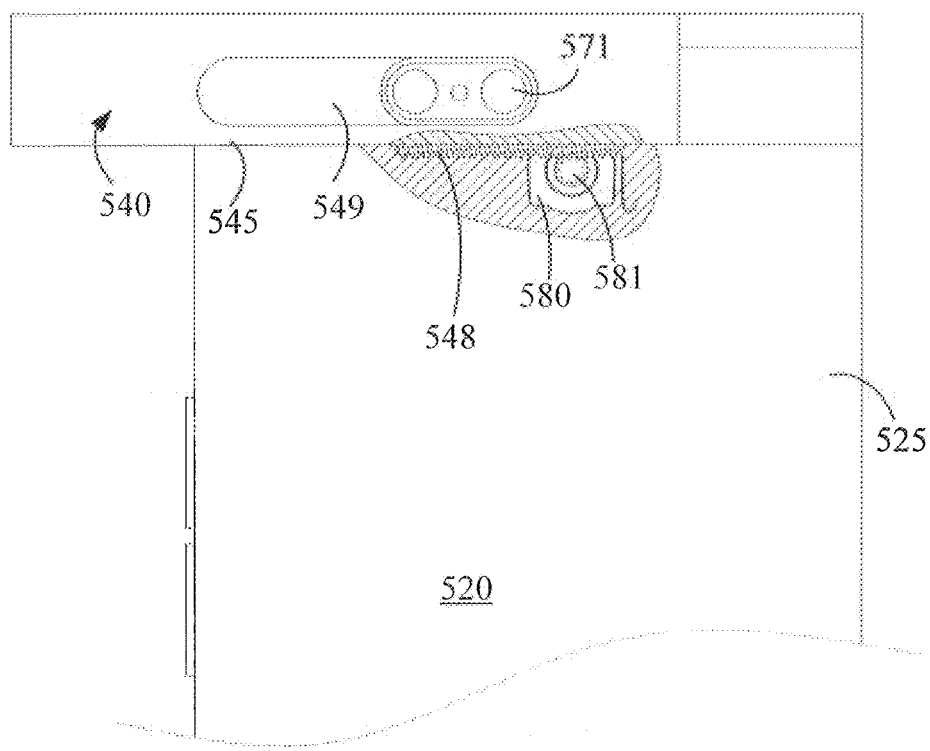
FIG. 34 illustrates a local rear-view sectional schematic diagram of the mobile terminal illustrated in FIG. 29.

As illustrated in FIG. 34, the mobile terminal further includes another camera 571. Said another camera is arranged on the first shell 520 and for example, is arranged on the bearing portion 510 extending from the first shell 520. The bottom plate 545 of the second shell 540 is provided with a through hole 549 so as to expose out said another camera 571. An orientation of a light incident surface of said another camera 571 is different from that of the display screen 550. Said another camera 571 does not move along with the second shell 540. Said another camera 571 may be used as a rear camera. An extension direction of the through hole 549 is parallel to the end face 502.

As illustrated in FIG. 34, the mobile terminal further includes a motor 580. The motor 580 may be fixed on the first shell 520 and for example, is fixed on the bottom wall 525 of the first shell 520. An output shaft of the motor 580 is provided with a gear 581. The second shell 540 is provided with a rack 548. For example, the rack 548 may be arranged on the bottom plate 545. The rack 548 and the gear 581 are cooperated in such a way that the operation of the motor 580 drives the second shell 540 to slide relative to the first shell 520. It may be understood that, a driving manner of the motor 580 may be the same as that in other embodiments. Characteristics mentioned in other embodiments and not mentioned in this embodiment may be applied to this embodiment as long as there is no contradiction with the characteristics mentioned in this embodiment, such as other types of transmission mechanisms, and will not be repeated herein for a simple description.

Figure 35:
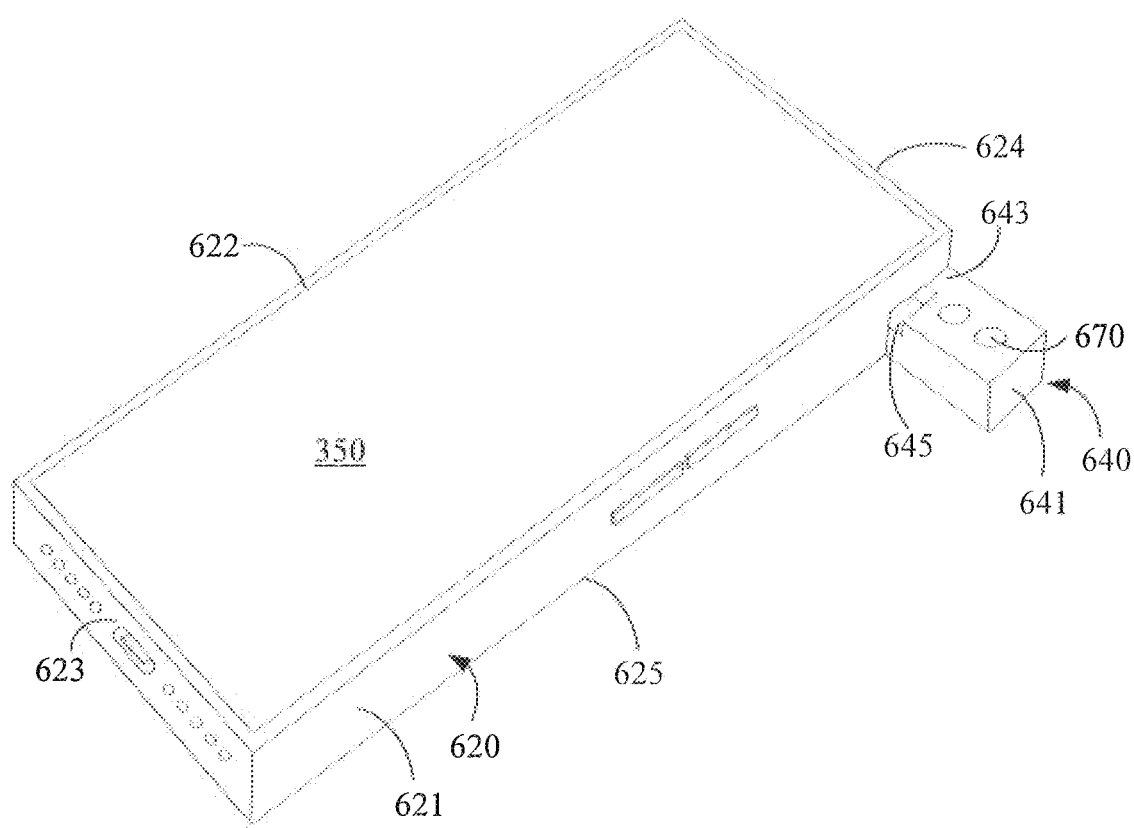
FIG. 35 illustrates a stereoscopic structural schematic diagram of a mobile terminal provided by a sixth embodiment of the disclosure.

FIG. 35 illustrates a mobile terminal provided by a sixth embodiment of the disclosure. The mobile terminal also includes a rear housing, a display screen 650 and a camera 670. The rear housing includes a first shell 620 and a second shell 640 arranged slidably relative to each other.

The first shell 620 includes a bottom wall 625 as well as a first side perimeter wall 621, a second side perimeter wall 622 and a third side perimeter wall 623 extending from three edges of the bottom wall 625. The first side perimeter wall 621 and the second side perimeter wall 622 are arranged opposite to one another and the third side perimeter wall 623 is connected between the first side perimeter wall 621 and the second side perimeter wall 622.

The second shell 640 includes a bottom plate 645 as well as a side wall 641 and an end wall 643 extending from two adjacent edges of the bottom plate 645. The end wall 643 is arranged at the edge of one end of the bottom plate 645. Another end of the bottom plate 645, opposite to the end at where the end wall 643 is located, is oriented towards the third side perimeter wall 623 of the first shell 620. The camera 670 is arranged on the side wall 641. The side wall 641 and the second side perimeter wall 622 are arranged opposite to one another.

The difference from the mobile terminal in the fifth embodiment is that the first shell 620 further includes a fourth side perimeter wall 624. The fourth side perimeter wall 624 is connected between the first side perimeter wall 621 and the second side perimeter wall 622. The tail end edges of the first side perimeter wall 621, the second side perimeter wall 622, the third side perimeter wall 623 and the fourth side perimeter wall 624 are flush, are located in a same horizontal plane and are simultaneously connected with the display screen 650.

An outer surface of the end wall 643 of the second shell 640 is flush with an outer surface of the fourth side perimeter wall 624 of the first shell 620.

Other characteristics not mentioned in the mobile terminal provided by the sixth embodiment may be the same as the fifth embodiment and thus will not be repeated.

Each technical characteristic of the above embodiments may be combined freely. To describe briefly, all possible combinations for the each technical characteristic of the above embodiments are not described. However, as long as there is no conflict among the combinations of the technical characteristics, all should be considered as a scope recorded by the specification.

The above embodiments only express several implementation manners of the disclosure, and the description is specific and detail but cannot be understood as the limit to the scope of the disclosure. It is to be noted that, those of ordinary skill in the art may further make several variations and improvements without departing from the concept of the disclosure and all pertain to the scope of protection of the disclosure. Accordingly, the scope of protection of the disclosure should be subject to the appended claims.

The invention claimed is:

1. A mobile terminal, comprising:
a rear housing, comprising a first shell, a bearing portion and a second shell, wherein the bearing portion extends from the first shell, the bearing portion and the first shell cooperatively defining a receiving space, the second shell being slidably arranged on the bearing portion and being movable relative to the first shell to be in a first position and a second position; in the first position, the second shell fills and levels up the receiving space and surrounds the bearing portion; and in the second position, at least a part of the bearing portion is exposed due to a movement of the second shell;
a display screen, connected with the first shell; and
a camera, arranged on the second shell, wherein in the first position, a light incident surface of the camera is blocked, and in the second position, the light incident surface of the camera is exposed,
wherein the first shell comprises a bottom wall as well as a first side perimeter wall and a second side perimeter wall extending from two opposite edges of the bottom wall, an end face being formed at the receiving space, and an intersecting line of the end face with an outer surface of the bottom wall being a straight line or a curved line.

2. The mobile terminal of claim 1, wherein the bearing portion comprises a substrate connected with the bottom wall, the thickness of the substrate being smaller than that of the bottom wall.

3. The mobile terminal of claim 1, wherein the second shell comprises a bottom plate as well as a first side wall, a second side wall and an end wall that are connected with the bottom wall, the first side wall and the second side wall being arranged at two opposite edges of the bottom plate, the end wall being connected between the first side wall and the second side wall and being located at one end of the bottom plate, the camera being arranged on the end wall, an outer surface of the second side wall being flush with an outer surface of the first side perimeter wall, an outer surface of the second side wall being flush with an outer surface of the second side perimeter wall; in the first position, another end of the bottom plate, opposite to the end at where the end wall is located, is abutted against the end face; and in the second position, said another end of the bottom plate is separated from the end face.

4. The mobile terminal of claim 3, wherein tail end edges of the first side perimeter wall and the second side perimeter wall are connected with the display screen, tail end edges of the first side wall and the second side wall of the second shell being flush with tail end edges of the first side perimeter wall and the second side perimeter wall and jointly bear the display screen in the first position.

5. The mobile terminal of claim 3, wherein the first shell further comprises a third side perimeter wall, the third side perimeter wall being connected between the first side perimeter wall and the second side perimeter wall, tail end edges of the first side perimeter wall, the second side perimeter wall and the third side perimeter wall are connected with the display screen, and the third side perimeter wall being provided with a connection port.

6. The mobile terminal of claim 3, wherein the first shell further comprises a fourth side perimeter wall connected between the first side perimeter wall and the second side perimeter wall, tail end edges of the first side perimeter wall, the second side perimeter wall and the fourth side perimeter wall being connected with the display screen; in the first position, an outer surface of the end wall of the second shell is flush with an outer surface of the fourth side perimeter wall; and in the second position, the end wall of the second shell is unaligned with the fourth side perimeter wall.

7. The mobile terminal of claim 3, further comprising another camera arranged on the outer surface of the bottom plate.

8. The mobile terminal of claim 3, further comprising another camera arranged on the bearing portion, wherein the bottom plate of the second shell is provided with a through hole, and said another camera being exposed from the through hole.

9. The mobile terminal of claim 3, further comprising another camera arranged on the bearing portion, wherein the bottom plate of the second shell is provided with a through hole, said another camera being exposed from the through hole, and the through hole penetrating through said another end of the bottom plate.

10. The mobile terminal of claim 3, further comprising a functional button, wherein the functional button is arranged on at least one of the first side wall and the second side wall of the second shell.

11. The mobile terminal of claim 1, wherein the second shell comprises a bottom plate as well as a side wall and an end wall connected with the bottom plate, the camera being arranged on the side wall, the side wall and the second side perimeter wall being arranged opposite to one another; in the first position, an outer surface of the side wall is flush with the outer surface of the first side perimeter wall; and in the second position, the side wall is unaligned with the first side perimeter wall to expose the light incident surface of the camera.

12. A mobile terminal, comprising:
a rear housing, comprising a first shell, a bearing portion and a second shell, wherein the bearing portion extends from the second shell, the bearing portion and the second shell cooperatively defining a receiving space, the second shell being arranged slidably relative to the first shell via the bearing portion and being movable relative to the first shell to be in a first position and a second position; in the first position, the first shell fills and levels up the receiving space and surrounds the bearing portion; and in the second position, at least a part of the bearing portion is exposed due to the movement of the second shell;
a display screen, connected with the first shell; and
a camera, arranged on the second shell, wherein in the first position, a light incident surface of the camera is blocked, and in the second position, the light incident surface of the camera is exposed,
wherein the first shell comprises a bottom wall as well as a first side perimeter wall and a second side perimeter wall extending from two opposite edges of the bottom wall, an end face being formed at the receiving space, and an intersecting line of the end face with an outer surface f the bottom wall being a straight line or a curved line.

13. A mobile terminal, comprising a rear housing, a display screen and a camera, wherein the rear housing comprises a first shell and a second shell, the first shell being fixedly connected with the display screen, the second shell being able to slid relative to the display screen and being able to be stopped at a first position and a second position; when the second shell is stopped at the first position, the first shell contacts the second shell to jointly bear the display screen and enable the rear housing to be of an opened-box shape; the first shell comprises a bottom wall as well as a first side perimeter wall, a second side perimeter wall and a third side perimeter wall extending from three edges of the bottom wall, the first side perimeter wall and the second side perimeter wall being arranged opposite to one another and the third side perimeter wall being connected between the first side perimeter wall and the second side perimeter wall, the second shell comprising a bottom plate as well as a first side wall, a second side wall and an end wall extending from three edges of the bottom plate, the first side wall and the second side wall being arranged opposite to one another, the end wall being connected between the first side wall and the second side wall, an outer surface of the bottom wall being flush with an outer surface of the bottom plate, an outer surface of the first side perimeter wall being flush with an outer surface of the first side wall, and an outer surface of the second side perimeter wall being flush with an outer surface of the second side wall;
the camera is arranged on the second shell; when the second shell is slid to the first position, the camera is located inside the mobile terminal; and when the second shell is slid to the second position, the camera can be exposed from the mobile terminal, and an orientation of a light incident surface of the camera is the same as that of the display screen.

14. The mobile terminal of claim 13, further comprising a motor, wherein an output shaft of the motor is provided with a gear, the second shell being provided with a rack, and the rack and the gear being cooperated in such a way that the operation of the motor drives the second shell to slide relative to the first shell.

15. The mobile terminal of claim 13, wherein the second shell is provided with a magnetic piece, the first shell is provided with an electromagnet; an attractive force or a repulsive force for the magnetic piece on the second shell is generated by changing a polarity of the electromagnet, so as to enable the second shell to be transformed between the first position and the second position.

16. The mobile terminal of claim 13, further comprising a slide block, a pull rod and an elastic piece, wherein the slide block is arranged on the second shell and is in sliding fit with the first shell, the slide block being provided with a quasi-heart-shaped groove having a locked position and a released position, one end of the pull rod being pivotally connected to the first shell, and another end of the pull rod being movably arranged in the quasi-heart-shaped groove, the elastic piece being compressively arranged between the first shell and the slide block, said another end of the pull rod being able to be stopped at the locked position or the released position by virtue of an elastic force provided by the elastic piece; when said another end of the pull rod is stopped at the locked position, the second shell is in the first position; and when said another end of the pull rod is stopped at the released position, the second shell is in the second position.

17. The mobile terminal of claim 13, further comprising a gear pair and a screw rod that are arranged on the first shell, a transmission rod connected with the second shell, and a transmission pin arranged on the transmission rod, wherein the screw rod is provided with a spiral groove cooperated with the transmission pin, and the gear pair drives the screw rod into rotation, so that the transmission pin is translated along the spiral groove and thus the second shell can be transformed between the first position and the second position.

18. The mobile terminal of claim 13, wherein when the second shell is in the first position, a slit between the bottom wall of the first shell and the bottom plate of the second shell is of a straight line type or a curved line type.

19. The mobile terminal of claim 13, wherein when the second shell is in the first position, a slit between the bottom wall of the first shell and the bottom plate of the second shell comprises a V-shaped section, an opening of the V-shaped section being toward the second shell.

* * * * *